(12) United States Patent
Cao et al.

(10) Patent No.: US 11,922,638 B2
(45) Date of Patent: Mar. 5, 2024

(54) MEDICAL IMAGE SEGMENTATION METHOD AND APPARATUS, COMPUTER DEVICE, AND READABLE STORAGE MEDIUM

(71) Applicant: TENCENT TECHNOLOGY (SHENZHEN) COMPANY LIMITED, Shenzhen (CN)

(72) Inventors: Shilei Cao, Shenzhen (CN); Yifan Hu, Shenzhen (CN); Kai Ma, Shenzhen (CN); Yefeng Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 376 days.

(21) Appl. No.: 17/514,467

(22) Filed: Oct. 29, 2021

(65) Prior Publication Data

US 2022/0051416 A1 Feb. 17, 2022

Related U.S. Application Data

(63) Continuation of application No. PCT/CN2020/105409, filed on Jul. 29, 2020.

(30) Foreign Application Priority Data

Aug. 19, 2019 (CN) .................. 201910764981.X

(51) Int. Cl.
*G06T 7/215* (2017.01)
*G06N 3/088* (2023.01)
*G06T 7/00* (2017.01)

(52) U.S. Cl.
CPC ............. *G06T 7/215* (2017.01); *G06N 3/088* (2013.01); *G06T 7/0012* (2013.01); *G06T 2207/10081* (2013.01); *G06T 2207/10088* (2013.01)

(58) Field of Classification Search
CPC .......... G06N 3/088; G06T 2207/10016; G06T 2207/10056; G06T 2207/10068;
(Continued)

(56) References Cited

U.S. PATENT DOCUMENTS 7,522,749 B2 4/2009 Zitnick, III et al.
2008/0112649 A1 5/2008 Chen et al.
(Continued)

FOREIGN PATENT DOCUMENTS

CN 103871076 A 6/2014
CN 109492608 A 3/2019
(Continued)

OTHER PUBLICATIONS

International Search Report with English translation and Written Opinion regarding PCT/CN2020/105409 dated Oct. 29, 2020.
(Continued)

*Primary Examiner* — Manuchehr Rahmjoo
(74) *Attorney, Agent, or Firm* — Crowell & Moring LLP

(57) ABSTRACT

The disclosure relates to methods, devices, systems, and computer storage medium for performing medical image segmentation. The method includes: The method includes: obtaining, by a device, a first medical image and a second medical image with a labeled region; performing, by the device, feature extraction on the first medical image and the second medical image respectively, to obtain first feature information of the first medical image and second feature information of the second medical image; obtaining, by the device, optical flow motion information from the second medical image to the first medical image according to the first feature information and the second feature information; and segmenting, by the device, the first medical image
(Continued)

according to the optical flow motion information and the labeled region, to obtain a segmentation result of the first medical image.

12 Claims, 15 Drawing Sheets

(58) Field of Classification Search
CPC .......... G06T 2207/10081; G06T 2207/10088; G06T 2207/20081; G06T 2207/20084; G06T 2207/30048; G06T 2207/30056; G06T 2207/30084; G06T 2207/30096; G06T 2207/30101; G06T 7/0012; G06T 7/11; G06T 7/215; G06T 7/246; G06T 7/269
See application file for complete search history.

(56) References Cited

U.S. PATENT DOCUMENTS

2009/0028403 A1* 1/2009 Bar-Aviv .............. G06T 7/0012
382/128
2015/0310626 A1 10/2015 Yamamoto et al.

FOREIGN PATENT DOCUMENTS

| | | |
|---|---|---|
| CN | 110490881 A | 11/2019 |
| JP | 2015-009152 A | 1/2015 |
| JP | 2015-210562 A | 11/2015 |

OTHER PUBLICATIONS

Extended European Search Report regarding 20854167.2 dated May 23, 2022, 9 pages.
Zhao et al., "Data Augmentation Using Learned Transformations for One-Shot Medical Image Sepmentation," 2019 IEEE/CVF Conference on Computer Vision and Pattern Recognition, IEEE, Jun. 15, 2019, pp. 8535-8545.
Lee et al., "Few Labeled Atlases 1,13-15 are Necessary for Deep-Learning-Based Segmentation," Arxiv.Org, Cornell University Library, 201 Olin Library Cornell University Ithaca, NY, Aug. 13, 2019, 9 pages.
Wang et al., "LT-Net: Label 1-15 Transer by Learning Reversible Voxel-Wise Correspondence for One-Shot Medical Image Segmentation", 2020 IEEE/CVF Conference on Computer Vision and Pattern Recognition, IEEE, Jun. 13, 2020, pp. 9159-9168.
Zhang et al., "A Survey on Deep 1-15 Learning of Small Sample in Biomedical Image Analysis", Arxiv.Org, Cornell University Library, 201 Olin Library Cornell University Ithaca, NY, Aug. 1, 2019, 23 pages.
Qiu et al., "Motionsubject segmentation algorithm based on spatial-temporal information" with English Abstract. Department of Electronic Information Engineering, NingBo Polyteachnic, China, and School of Software Technology, Zhejiang University, NingBo, China, Laser Journal( vol. 35. No. 12. 2014), 5 pages.
Japanese Office Action and English translation regarding 2021-561990 dated Oct. 31, 2022.
Zizhao Zhang et al. "Translating and Segmenting Multimodal Medical Volumes with Cycle- and Shape-Consistency Generative Adversarial Network," 2018 IEEE/CVF Conference on Computer Vision and Pattern Recognition, IEEE, Jun. 18. 2018, pp. 9242-9251.
"Biomedical fusion 3D image processing" with English abstract translation, F83788A1, dated Mar. 26, 2015, 5 pages.

* cited by examiner

MEDICAL IMAGE SEGMENTATION METHOD AND APPARATUS, COMPUTER DEVICE, AND READABLE STORAGE MEDIUM

RELATED APPLICATION

This application is a continuation application of PCT Patent Application No. PCT/CN2020/105409, filed on Jul. 29, 2020, which claims priority to Chinese Patent Application No. 201910764981.X, filed with the China National Intellectual Property Administration on Aug. 19, 2019, both of which are incorporated herein by reference in their entireties.

FIELD OF THE TECHNOLOGY

This application relates to the field of artificial intelligence (AI) technologies, and specifically, to a medical image segmentation method and apparatus, a computer device, and a readable storage medium.

BACKGROUND OF THE DISCLOSURE

As artificial intelligence (AI) advances, the AI has been widely applied in medical fields, especially in medical image segmentation. The segmentation of a liver is used as an example. Specially, a convolutional neural network is trained using liver-labeled sample images; then, a three-dimension (3D) liver image to be segmented, such as a computed tomography (CT) image of a liver, is inputted into the trained convolutional neural network for segmentation, to obtain an organ segmentation result, such as a liver region, and the like.

However, the current AI segmentation approach relies heavily on the accuracy of organ labeling, and needs a large number of organ-labeled medical image samples to train the network, which makes the organ segmentation very time-consuming, thereby resulting in low efficiency of the segmentation.

The present disclosure describes embodiments for performing medical image segmentation, addressing at least one of the problems/issues discussed above, for example, avoiding the need of a large number of labeled samples to train the network. Thus, the present disclosure improves the technology in AI, machine learning, and/or image processing.

SUMMARY

Embodiments of this present disclosure provide a medical image segmentation method and apparatus, a computer device, and a readable storage medium.

The present disclosure describes a method for performing medical image segmentation. The method includes: obtaining, by a device, a first medical image and a second medical image with a labeled region. The device includes a memory storing instructions and a processor in communication with the memory. The method also includes performing, by the device, feature extraction on the first medical image and the second medical image respectively, to obtain first feature information of the first medical image and second feature information of the second medical image; obtaining, by the device, optical flow motion information from the second medical image to the first medical image according to the first feature information and the second feature information; and segmenting, by the device, the first medical image according to the optical flow motion information and the labeled region, to obtain a segmentation result of the first medical image.

The present disclosure describes an apparatus for performing medical image segmentation. The apparatus includes a memory storing instructions; and a processor in communication with the memory. When the processor executes the instructions, the processor is configured to cause the apparatus to perform: obtaining a first medical image and a second medical image with a labeled region, performing feature extraction on the first medical image and the second medical image respectively, to obtain first feature information of the first medical image and second feature information of the second medical image, obtaining optical flow motion information from the second medical image to the first medical image according to the first feature information and the second feature information, and segmenting the first medical image according to the optical flow motion information and the labeled region, to obtain a segmentation result of the first medical image.

The present disclosure describes a non-transitory computer-readable storage medium, storing computer-readable instructions. The computer-readable instructions, when executed by a processor, are configured to cause the processor to perform: obtaining a first medical image and a second medical image with a labeled region; performing feature extraction on the first medical image and the second medical image respectively, to obtain first feature information of the first medical image and second feature information of the second medical image; obtaining optical flow motion information from the second medical image to the first medical image according to the first feature information and the second feature information; and segmenting the first medical image according to the optical flow motion information and the labeled region, to obtain a segmentation result of the first medical image.

A medical image segmentation method is provided, performed by a computer device, the method including:
  obtaining a first medical image and a second medical image with a labeled target object region;
  performing feature extraction on the first medical image and the second medical image respectively, to obtain first feature information of the first medical image and second feature information of the second medical image;
  obtaining optical flow motion information from the second medical image to the first medical image according to the first feature information and the second feature information; and
  segmenting a target object in the first medical image according to the optical flow motion information and the labeled target object region, to obtain a segmentation result of the first medical image.

A medical image segmentation apparatus is provided, including:
  an obtaining unit, configured to obtain a first medical image and a second medical image with a labeled target object region;
  a feature extraction unit, configured to perform feature extraction on the first medical image and the second medical image respectively, to obtain first feature information of the first medical image and second feature information of the second medical image;
  an optical flow unit, configured to obtain optical flow motion information from the second medical image to the first medical image according to the first feature information and the second feature information; and a segmentation unit, configured to segment a target object in the first medical image according to the optical flow motion information and the labeled target object region, to obtain a segmentation result of the first medical image.

In an embodiment, the segmentation unit includes:
a reconstruction subunit, configured to perform target object region reconstruction according to the optical flow motion information and the labeled target object region, to obtain a reconstructed target object region; and
a segmentation subunit, configured to use the reconstructed target object region as the segmentation result of the first medical image.

In an embodiment, the reconstruction subunit is configured to perform trilinear interpolation on the optical flow motion information, to obtain processed optical flow motion information; and perform target object region reconstruction based on the processed optical flow motion information and the labeled target object region, to obtain the reconstructed target object region.

In an embodiment, the optical flow unit includes:
an association subunit, configured to associate the first feature information with the second feature information, to obtain pixel position correspondence information between the second medical image and the first medical image; and
a sampling subunit, configured to perform an upsampling operation on the pixel position correspondence information, to obtain the optical flow motion information from the second medical image to the first medical image.

In an embodiment, the association subunit is specifically configured to:
perform a convolution operation on the first feature information of the first medical image, to obtain first convolution feature information;
perform a convolution operation on the second feature information of the second medical image, to obtain second convolution feature information;
fuse the first convolution feature information and the second convolution feature information, to obtain first fusion feature information; and
fuse the first fusion feature information and the first convolution feature information, to obtain the pixel position correspondence information between the second medical image and the first medical image.

In an embodiment, the optical flow unit is specifically configured to: use a first generator in a first generative adversarial network to obtain the optical flow motion information from the second medical image to the first medical image according to the first feature information and the second feature information.

In an embodiment, the medical image segmentation apparatus further includes:
a sample obtaining unit, configured to obtain a first sample medical image and a second sample medical image with a target object labeling result;
a first sample optical flow unit, configured to use a first generator in a first generative adversarial network to be trained to obtain first sample optical flow motion information from the second sample medical image to the first sample medical image;
a first reconstruction unit, configured to use a reconstruction module in the first generative adversarial network to be trained to perform image reconstruction based on the first sample optical flow motion information, to obtain a first reconstructed medical image and a first segmentation result corresponding to the first sample medical image;
a second sample optical flow unit, configured to use a second generator in a second generative adversarial network to obtain second sample optical flow motion information from the first reconstructed medical image to the second sample medical image;
a second reconstruction unit, configured to use a reconstruction module in the second generative adversarial network to perform image reconstruction based on second sample optical flow motion information, to obtain a second reconstructed medical image and a second segmentation result corresponding to the second sample medical image; and
a training unit, configured to train the first generative adversarial network to be trained according to the first reconstructed medical image, the first segmentation result, the second reconstructed medical image, and the second segmentation result, to obtain a trained first generative adversarial network.

In an embodiment, the training unit further includes:
a reconstruction loss obtaining subunit, configured to obtain a reconstruction consistency loss in an image reconstruction space according to the first reconstructed medical image and the second reconstructed medical image;
a segmentation loss obtaining subunit, configured to obtain a segmentation consistency loss in a segmentation space according to the first segmentation result, the second segmentation result, and the target object labeling result of the second sample medical image; and
a training subunit, configured to train the first generative adversarial network to be trained according to the reconstruction consistency loss and the segmentation consistency loss, to obtain the trained first generative adversarial network.

In an embodiment, the reconstruction consistency loss includes an image reconstruction consistency loss and a trajectory consistency loss. The reconstruction loss obtaining subunit is specifically configured to: obtain the image reconstruction consistency loss that the second sample medical image maintains a consistency with the second reconstructed medical image according to the second reconstructed medical image and the second sample medical image; and obtain the trajectory consistency loss that the first sample optical flow motion information is in a trajectory consistency with the second sample optical flow motion information according to the first sample optical flow motion information and the second sample optical flow motion information.

In an embodiment, the segmentation consistency loss includes an image segmentation consistency loss, mask value losses, and a semantic consistency loss.

The segmentation loss obtaining subunit is configured to obtain the image segmentation consistency loss that the target object labeling result maintains a consistency with the second segmentation result according to the second segmentation result and the target object labeling result; respectively obtain the mask value losses of the first segmentation result and the second segmentation result relative to a preset segmentation mask value according to the first segmentation result, the second segmentation result, and the preset segmentation mask value; and construct the semantic consistency loss that the first segmentation result maintains a semantic consistency across the image based on the first segmentation result.

In an embodiment, the segmentation loss obtaining subunit is further configured to derive pixel values in the first segmentation result along a preset direction, to obtain a derivation result of the preset direction; and construct the semantic consistency loss that the first segmentation result maintains the semantic consistency across the image according to the derivation result of the preset direction and the first segmentation result.

In an embodiment, the reconstruction loss obtaining subunit is specifically configured to generate an original medical image; transform the original medical image according to the first sample optical flow motion information and the second sample optical flow motion information, to obtain a transformed medical image; obtain a transformation loss between the transformed medical image and the original medical image; and use the transformation loss as the trajectory consistency loss that the first sample optical flow motion information is in a trajectory consistency with the second sample optical flow motion information.

In an embodiment, the medical image segmentation apparatus further includes an adversarial loss obtaining unit:
the adversarial loss obtaining unit is configured to use a discriminator in the first generative adversarial network to be trained to discriminate the first sample medical image and the first reconstructed medical image, to obtain a discrimination result; and obtain an adversarial loss of the first generative adversarial network according to the first reconstructed medical image and the discrimination result; and
the training unit is further configured to train the first generative adversarial network to be trained according to the adversarial loss, the reconstruction consistency loss, and the segmentation consistency loss, to obtain the trained first generative adversarial network.

A computer device is provided, including a memory, a processor, and a computer program stored on the memory and executable on the processor, the computer program, when executed by the processor, causing the processor to perform the operations in any one of the medical image segmentation methods provided in the embodiments of this application.

A computer-readable storage medium, storing a computer program, the computer program, when executed by a processor, causing the processor to perform the operations in any one of the medical image segmentation methods provided in the embodiments of this application.

Details of one or more embodiments of this application are provided in the subsequent accompanying drawings and descriptions. Other features, objectives, and advantages of this application are illustrated in the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show only some embodiments of this application, and a person of ordinary skill in the art may still derive other accompanying drawings according to the accompanying drawings without creative efforts.

DESCRIPTION OF EMBODIMENTS

Figure 1:
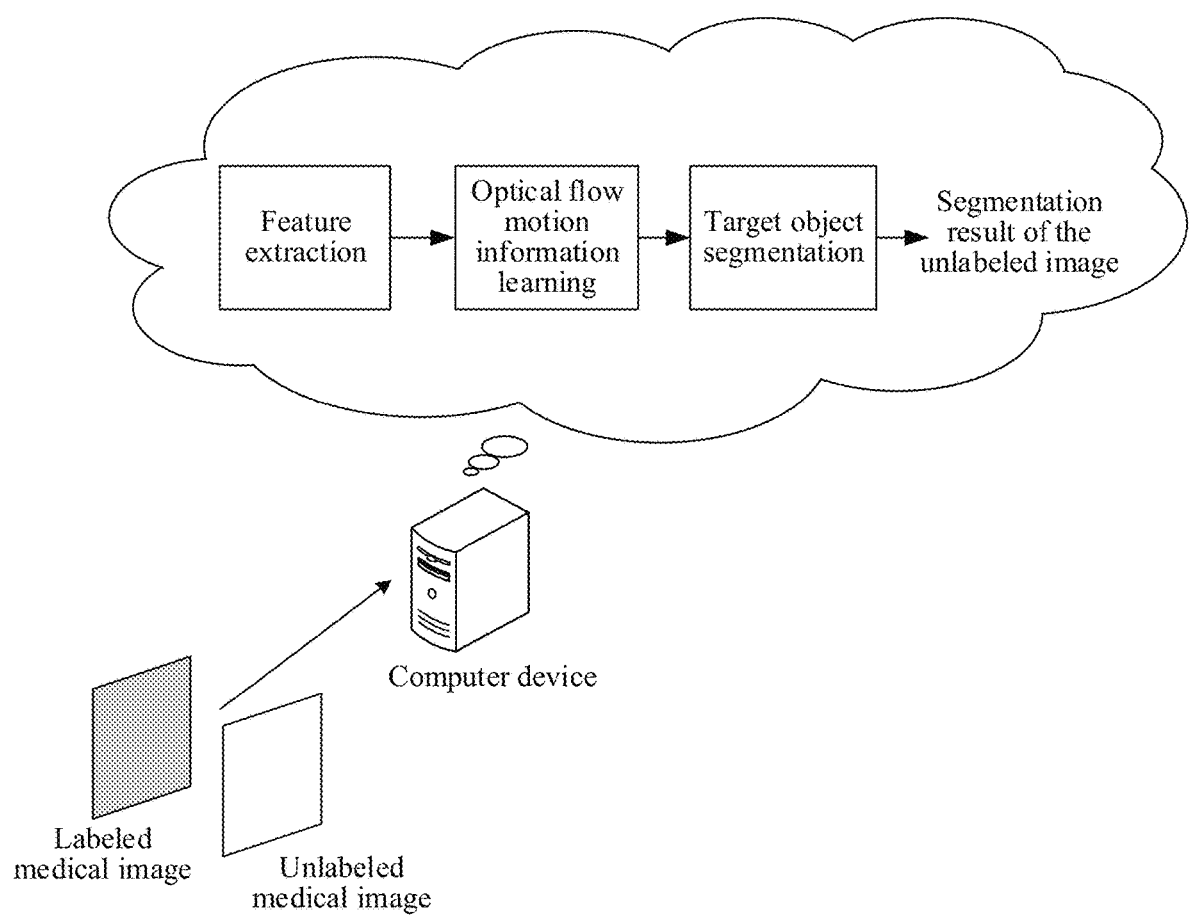
FIG. 1 is a schematic diagram of a scenario of a medical image segmentation method according to an embodiment of this application.

The technical solutions in the embodiments of this application are clearly and completely described below with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

The embodiments of this application provide a medical image segmentation method and apparatus, a computer device, and a computer-readable storage medium. The medical image segmentation apparatus may be integrated in a computer device. The computer device may be a server or a terminal, and the like.

The medical image segmentation solution provided in the embodiments of this application involves computer vision (CV) technologies of artificial intelligence (AI). Fundus images can be segmented through the CV technologies of AI, to obtain segmentation results.

The CV technology is a science that studies how to use a machine to "see", and furthermore, is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection. As a scientific discipline, the CV studies related theories and technologies and attempts to establish an AI system that can obtain information from images or multidimensional data. The CV technologies generally include technologies such as image processing, image recognition, image segmentation, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

In the embodiments of this application, the so-called image segmentation refers to a technology and process of segmenting an image into several specific regions with unique features and proposing objects of interest. In the embodiments of this application, it mainly refers to segmenting 3D medical images and finding required target objects such as organs. For example, liver regions, heart regions, and atrial regions are segmented from the 3D medical images. The segmented target objects, such as the organs, can be analyzed by medical staffs or other medical experts for further operations.

The present disclosure describes various embodiments, which may migrate object segmentation such as organ segmentation of a labeled image to an unlabeled image by learning the transformation from the labeled image to the unlabeled image. The present disclosure provides a technology improvement in the field of artificial intelligence, machine learning, and image processing. The present disclosure may solve a long-felt need of avoiding using large quantity of labeled data to train a conventional segmentation model. Target object segmentation such as organ segmentation may be performed on the unlabeled medical image by using the labeled medical image, which avoids the use of large amounts of labeled data to train a segmentation model in a conventional solution. Only one labeled image and one image to be segmented need to be provided, so as to realize the segmentation of the image to be segmented, thereby greatly improving the precision and efficiency of the medical image segmentation.

For example, referring to FIG. 1, as an example, the medical image segmentation device is integrated in a computer device. The computer device may obtain a first medical image and a second medical image with a labeled target object region; perform feature extraction on the first medical image and the second medical image respectively, to obtain first feature information of the first medical image and second feature information of the second medical image; obtain optical flow motion information from the second medical image to the first medical image according to the first feature information and the second feature information; and segment a target object in the first medical image according to the optical flow motion information and the labeled target object region, to obtain a segmentation result of the first medical image. For example, a heart region may be segmented from an unlabeled atrial image.

Detailed descriptions are separately provided below. The description sequence of the following embodiments is not intended to limit preference orders of the embodiments.

This embodiment is described from the perspective of the medical image segmentation apparatus. The medical image segmentation apparatus may be specifically integrated in a computer device, and the computer device may be a server, a terminal, or another device. The terminal may include a tablet computer, a notebook computer, a personal computer (PC), a micro processing box, or another device. The server may be implemented by using an independent server or a server cluster formed by a plurality of servers.

Figure 2A:
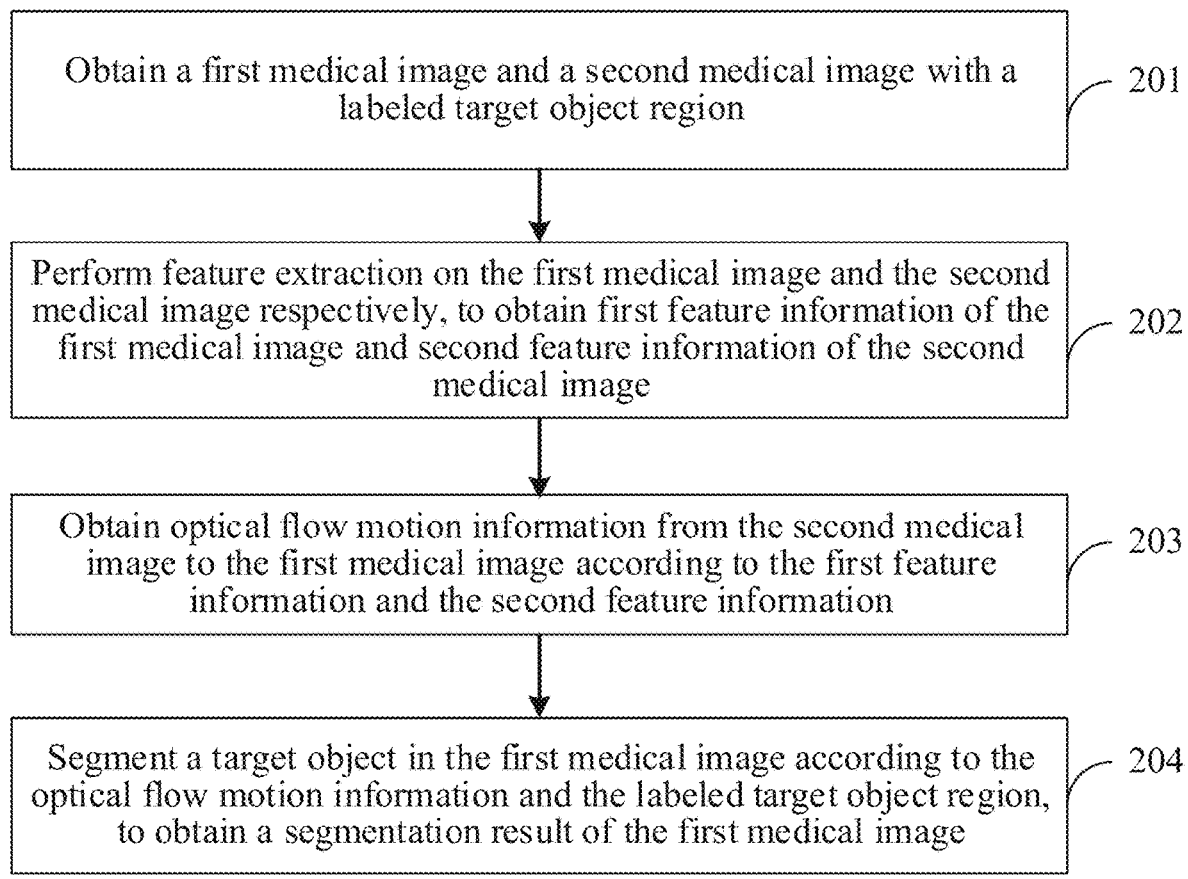
FIG. 2A is a flowchart of a medical image segmentation method according to an embodiment of this application.

As shown in FIG. 2A, a specific process of the medical image segmentation method may be as follows:

Step 201. Obtain a first medical image and a second medical image with a labeled target object region. In various embodiments in the present disclosure, a labeled target object region may refer to as labeled region.

A medical image may be collected by a medical image acquisition device after performing image acquisition on a biological tissue such as a heart or a liver, and then provided to the medical image segmentation apparatus. The medical image acquisition device may include an electronic device such as a magnetic resonance imaging (MRI) machine, a computed tomography (CT) device, a vaginal microscope, or an endoscope.

The first medical image is a medical image without a labeled target object, which is to be segmented. It may be acquired by the medical image acquisition device.

The target object may be a biological organ such as a liver, a heart, or a kidney. In some embodiments, the target object may also be an abnormal biological tissue, such as a tumor.

The second medical image is a medical image with a labeled target object, such as a heart image with a labeled heart region.

The objective of the method in the embodiments of this application is to segment the target object region from the first medical image by using the labeled second medical image.

It may be understood that, the first and second in the embodiments of this application are merely for the purpose of distinguishing and do not have limitations in terms of time sequence and the like.

Step 202. Perform feature extraction on the first medical image and the second medical image respectively, to obtain first feature information of the first medical image and second feature information of the second medical image.

For example, the computer device may respectively perform a convolution operation on the first medical image and the second medical image, to extract the first feature information of the first medical image and the second feature information of the second medical image.

Figure 2B:
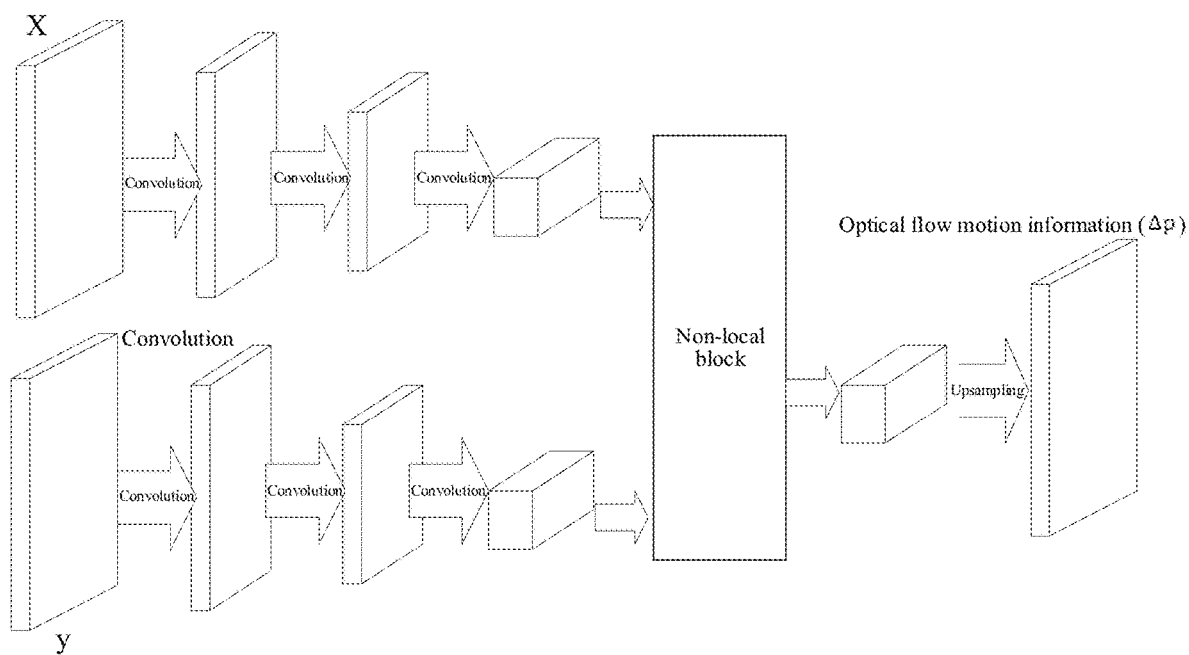
FIG. 2B is a schematic framework diagram of a generator according to an embodiment of this application.

In an embodiment, in order to ensure the precision and efficiency of feature extraction, the computer device may use a siamese network to extract the feature information. For example, as shown in FIG. 2B, a siamese convolutional neural network is used to respectively perform a convolution operation on the first medical image and the second medical image, to extract the first feature information of the first medical image and the second feature information of the second medical image. As shown in FIG. 2B, the computer device respectively performs a convolution operation on a labeled medical image x and an unlabeled medical image y, to extract their respective feature maps. In one implementation, the labeled medical image x may refer to the second medical image with the labeled target object region; and/or the unlabeled medical image y may refer to the first medical image.

The convolutional neural network may include multiple convolutional layers. Each convolutional layer includes a convolution of a preset size (such as a 3*3*3 convolution), a batch normalization layer, and a nonlinear active layer ReLu. That is, each convolutional layer performs convolution, normalization, and activation function processing on its input.

The first medical image is used as an example. The computer device may input the first medical image into a first convolutional layer of the convolutional neural network, in which convolution, normalization, and activation function processing are sequentially performed to output corresponding feature information; then, input the outputted corresponding feature information into a next convolutional layer for processing, and so on until the last convolutional layer outputs final feature information. The first feature information of the first medical image may be the feature information outputted by the last convolutional layer of the convolutional neural network, as a finally outputted feature map.

Step 203. Obtain optical flow motion information from the second medical image to the first medical image according to the first feature information and the second feature information.

The optical flow is instantaneous speeds of pixel motions of a space moving object on an observation imaging plane, which uses temporal changes of pixels in an image sequence and a correlation between adjacent images to find a correspondence between a previous frame and a current frame, so as to calculate motion information of an object between adjacent images. Generally, the optical flow is generated by a motion of a foreground object itself, a motion of a camera, or a joint motion of the two in the scene.

Simply put, the optical flow is the "instantaneous speeds" of the pixel motions of the space moving object on the observation imaging plane. The study of the optical flow uses the temporal changes and the correlation of pixel intensity data in the image sequence to determine the motions of respective pixel positions. The study of an optical flow field aims to approximately obtain a motion field in reality that cannot be directly obtained from the image sequence.

The optical flow motion information may specifically be motion information of a pixel at a certain position in the second medical image moving to a target position in the first medical image, which includes motion parameters such as a motion direction and a motion speed.

As an example, a position of a pixel A in a $t^{th}$ medical image is (x1, y1). Then, the pixel A is found in a $(t+1)^{th}$ medical image again, and if its position is (x2, y2), the computer device can determine a motion parameter of the pixel A as: (ux, vy)=(x2, y2)−(x1, y1). In one implementation, the $t^{th}$ medical image may refer to the second medical image in the described medical image segmentation method; and/or the $(t+1)^{th}$ medical image may refer to the first medical image in the described medical image segmentation method.

In an embodiment, the computer device may learn pixel position association information between the images based on the feature information of the two medical images, to learn the optical flow motion information. Specifically, step 203 of "obtain optical flow motion information from the second medical image to the first medical image according to the first feature information and the second feature information" may include: associating the first feature information with the second feature information, to obtain pixel position correspondence information between the second medical image and the first medical image; and performing an upsampling operation on the pixel position correspondence information, to obtain the optical flow motion information from the second medical image to the first medical image.

In an embodiment of this application, in order to obtain the pixel position correspondence between the medical images, the feature information of the two medical images may be associated or fused, to associate the two images, so that the pixel position correspondence information between the two medical images can be obtained.

There may be various ways of feature association. For example, in an embodiment, the step of "associating the first feature information with the second feature information, to obtain pixel position correspondence information between the second medical image and the first medical image" may include: performing a convolution operation on the first feature information of the first medical image, to obtain first convolution feature information; performing a convolution operation on the second feature information of the second medical image, to obtain second convolution feature information; fusing the first convolution feature information and the second convolution feature information, to obtain first fusion feature information; and fusing the first fusion feature information and the first convolution feature information, to obtain the pixel position correspondence information between the second medical image and the first medical image.

In an embodiment, the step of "fusing the first convolution feature information and the second convolution feature information, to obtain first fusion feature information" includes: fusing the first convolution feature information and the second convolution feature information, to obtain fused convolution feature information; and fusing the fused convolution feature information with the first convolution feature information, to obtain the first fusion feature information.

In an embodiment, the step of "fusing the first fusion feature information and the first convolution feature information, to obtain the pixel position correspondence information between the second medical image and the first medical image" includes: performing a convolution operation on the first fusion feature information, to obtain third convolution feature information of a predetermined size, the size of the third convolution feature information being the same as the size of the first feature information; and fusing the third convolution feature information of the predetermined size with the first convolution feature information, to obtain the pixel position correspondence information between the second medical image and the first medical image.

In an embodiment, in order to precisely or quickly obtain the pixel position association information between the images, the computer device may perform a non-local operation, to obtain spatiotemporal association information between the pixels of the medical images. For example, referring to FIG. 2B, the non-local operation may be performed by using a non-local block, to learn a pixel-level position correspondence.

Figure 2C:
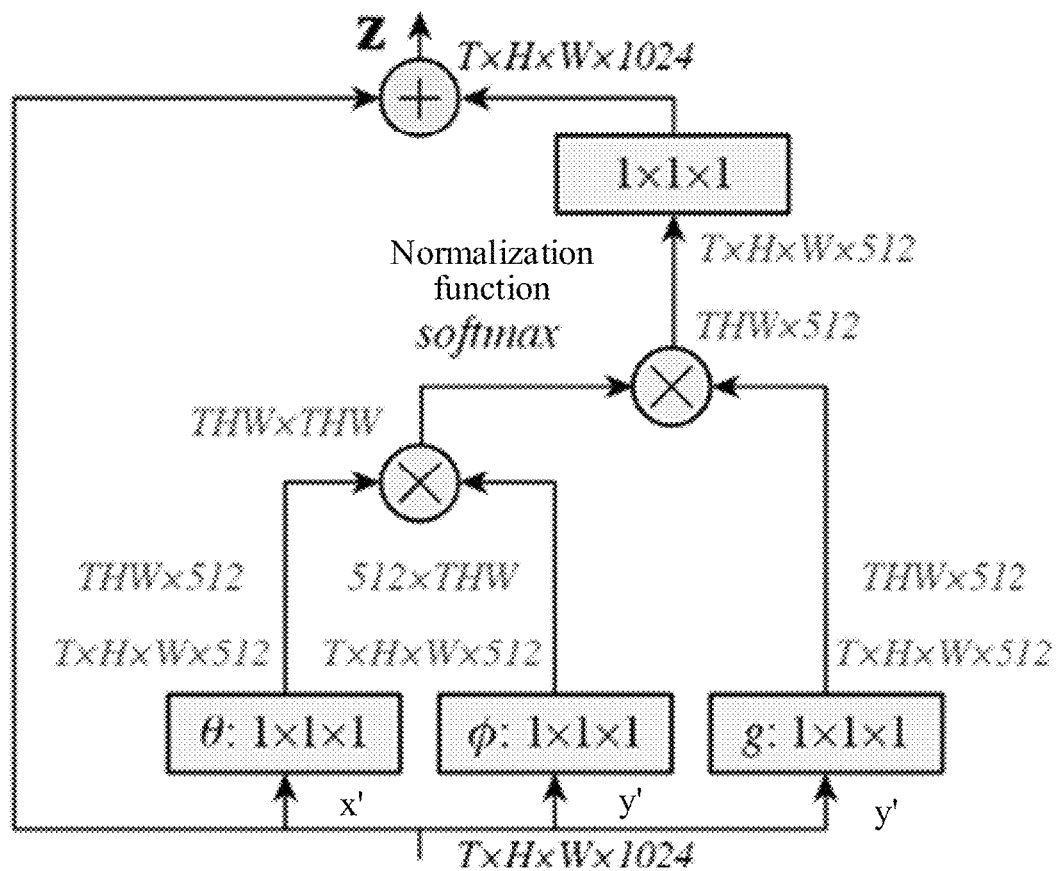
FIG. 2C is a schematic structural diagram of a non-local block according to an embodiment of this application.

FIG. 2C shows a schematic structural diagram of a non-local block. Assuming that a feature map of the labeled medical image x (namely, the second medical image) is x', and a feature map of the unlabeled medical image y (namely, the first medical image) is y'. Dimensions of x' and y' are respectively T*H*W*1024, T being a quantity of video frames (corresponding to a quantity of images in this application). The feature map size is T×H×W×1024, that is, there are 1024 channels.

The dimensions of the inputs x' and y' are T*H*W*1024. A convolution operation is performed by using convolution kernels with a quantity of 512 and a size of 1*1*1, to obtain outputs of 3 branches, dimensions of which are all T*H*W*512. After flat and transformation (trans) operations are performed, outputs of THW*512, 512*THW, and THW*512 are obtained. A matrix multiplication is performed on the two outputs of the first two branches, to obtain an output of THW*THW; and another matrix multiplication is performed on the output that has been processed by the softmax (a normalization function) processing and the output of the third branch, to obtain an output of THW*512 dimensions. Then, this output is reshaped into an output of T*H*W*512 dimensions, and the reshaped output is passed through a convolution layer with convolution kernels of a quantity of 1024 and a size of 1*1*1. After this, an element-wise sum is performed on the output and the feature map T*H*W*1024 of the original y', to obtain a final output result. The pixel position correspondence information between the labeled medical image x and the unlabeled medical image y can be obtained based on the output result.

Referring to FIG. 2B, after using the non-local block to learn the pixel position correspondence information between the labeled medical image x and the unlabeled medical image y, an upsampling operation may be performed on the pixel position correspondence information in an upsampling layer, to obtain the optical flow motion information $\Delta p$. The unlabeled medical image refers to the first medical image; and the labeled medical image refers to the second medical image.

Step 204. Segment a target object in the first medical image according to the optical flow motion information and the labeled target object region, to obtain a segmentation result of the first medical image.

In an embodiment, after the optical flow motion information $\Delta p$ (such as the directions and speeds of the pixel motions) is obtained, a target object region can be reconstructed based on the optical flow motion information. The reconstructed region is used as the segmentation result of the unlabeled medical image.

For example, step 204 may include: performing target object region reconstruction (such as migration) according to the optical flow motion information and the labeled target object region, to obtain the reconstructed target object region; and using the reconstructed target object region as the segmentation result of the first medical image. In an embodiment of this application, the target object region reconstruction may include target object region migration, and the like. The region reconstruction is implemented by migrating the target object region. In various embodiments, the target object region reconstruction may refer to as reconstruction.

There are many ways of reconstruction. For example, the pixels in the labeled target object region are moved according to the optical flow motion information, to obtain moved pixels; and the target object region is reconstructed according to the moved pixels. For example, pixels in a labeled organ region are migrated in a segmentation space based on the optical flow motion information $\Delta p$, to form a migrated region, which is used as an organ segmentation region of the unlabeled medical image.

In order to enable the optical flow motion information $\Delta p$ to be applied to the first medical image (since the optical flow motion information $\Delta p$ may be obtained under a setting of downsampling), and improve the reconstruction speed, in an embodiment, the computer device may perform trilinear interpolation on the optical flow motion information, and reconstruct an unlabeled first sample medical image based on processed optical flow motion information, to obtain a first reconstructed medical image. That is, the step of "segment a target object in the first medical image according to the optical flow motion information and the labeled target object region, to obtain a segmentation result of the first medical image" may include: performing trilinear interpolation on the optical flow motion information, to obtain processed optical flow motion information; and segmenting the target object in the first medical image based on the processed optical flow motion information and the labeled target object region, to obtain the segmentation result of the first medical image.

Specifically, the computer device may perform trilinear interpolation on the optical flow motion information, to obtain the processed optical flow motion information; perform target object region reconstruction based on the processed optical flow motion information and the labeled target object region, to obtain the reconstructed target object region; and use the reconstructed target object region as the segmentation result of the first medical image. In various embodiments in the present disclosure, the reconstructed target object region may refer to the reconstructed region.

For example, the computer device may perform an interpolation operation on the optical flow motion information in each preset direction (such as an x-axis, y-axis, or z-axis direction) based on the kernel F of the trilinear interpolation, to obtain the processed optical flow motion information. The processed optical flow motion information is optical flow motion information realized by the trilinear interpolation. Specifically, the trilinear interpolation process may be described in detail with reference to the following embodiments.

An embodiment of this application provides a solution for mapping an image to the segmentation space based on migrating the image. This solution sets image-to-image mapping modeling as a pixel-level optical flow estimation. By learning the optical flow motion information such as the directions and speeds of the pixel motions, the segmentation result of the unlabeled image is reconstructed or migrated from the labeling result of the labeled image. An idea of the entire solution is shown in FIG. 2D.

Figure 2D:
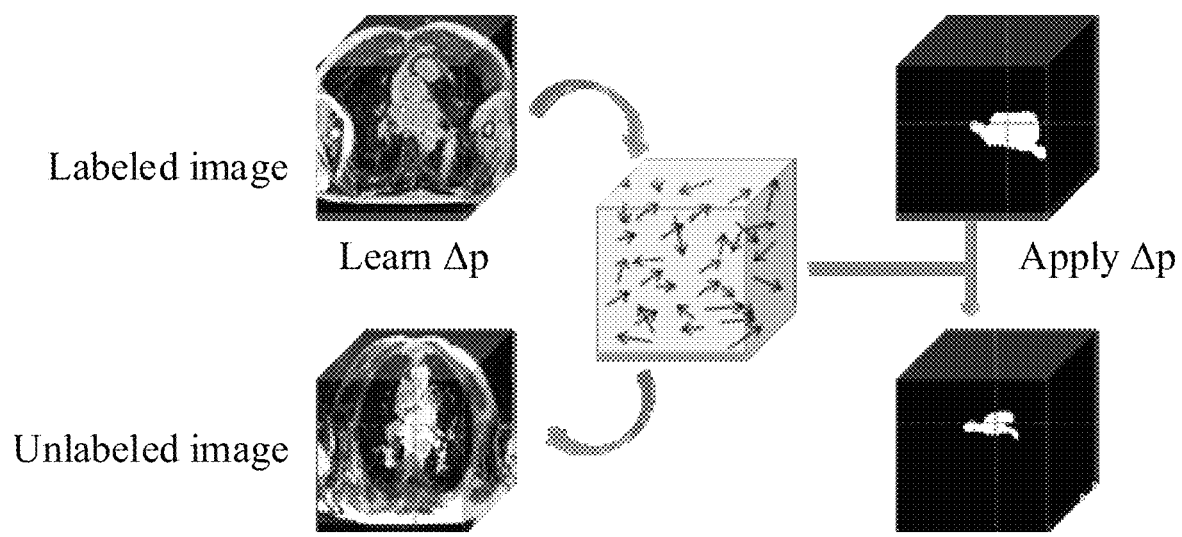
FIG. 2D is a schematic diagram of a segmentation principle according to an embodiment of this application.

As shown in FIG. 2D, as an example, the medical image is an atrial image. First, a labeled image with a labeled heart region and an unlabeled image are provided; then, optical flow motion information $\Delta p$ from the labeled image to the unlabeled image is learned. The heart region is reconstructed (or migrated) according to the labeled heart region and the optical flow motion information $\Delta p$. The reconstructed heart region (or the migrated heart region) is a heart segmentation result of the unlabeled image.

From the above, the solution provided in the embodiments of this application can migrate object segmentation such as organ segmentation of the labeled image to the unlabeled image by learning the transformation from the labeled image to the unlabeled image. Target object segmentation such as organ segmentation is performed on the unlabeled medical image by using the labeled medical image, which avoids the use of large amounts of labeled data to train a segmentation model in a conventional solution. Only one labeled image and one image to be segmented need to be provided, so as to realize the segmentation of the image to be segmented, thereby greatly improving the precision and efficiency of the medical image segmentation.

The segmentation solution provided in the embodiments of this application is applicable to various image segmentation scenes, such as a medical image labeling scene. The current pixel/voxel-level labeling is time-consuming, labor-intensive, and requires strong support from a doctor, which makes it difficult to obtain a large number of labels. However, in a case of using the solution provided in the embodiments of this application, the doctor only needs to precisely label one piece of data, and the remaining data can be labeled by using the solution provided in the embodiments of this application. Since the doctor only needs to label one target object such as an organ, and target object segmentation such as organ segmentation can be performed precisely on other unlabeled data, thereby saving a lot of time for the doctor to label.

In an embodiment of this application, the medical image segmentation method may be implemented by an AI deep learning network. For example, after the first medical image and the second medical image are obtained, a deep learning segmentation network may be used to segment the target object, such as an organ. Specifically, the segmentation network may perform the above steps 202 and 203, and a specific structure of the generator may refer to FIG. 2B.

The segmentation network may be trained on a large number of labeled datasets. There are many specific training approaches. For example, the segmentation network may be trained by back propagation based on a large number of organ-labeled medical image datasets. Specifically, a segmentation loss may be calculated (for example, calculated using a loss function) according to the target object segmentation results of the network and the labeling results, and the network is trained based on the segmentation loss.

For further consideration, since the medical imaging datasets are typically acquired by different medical image acquisition devices, the difference between domains of different datasets is relatively large, which seriously hinders the generalization performance of the deep network. Besides, a conventional training approach has a poor accuracy of learning the optical flow motion information, thereby resulting in low segmentation accuracy.

In order to ensure that the algorithm really plays a role in assisting diagnosis in the clinic, it is necessary to further improve the generalization performance and segmentation accuracy of the model. In addition, a supervised training approach is impractical to perform large-scale vessel classification and segmentation in the diagnosis of ocular diseases, since it needs additional vessel labeling, which is very time-consuming and expensive. Therefore, it is necessary to further design an unsupervised training approach that does not require additional labeling in the clinic.

In view of the above problems, an embodiment of this application provides a segmentation network training method using an unsupervised domain adaption technology. This method can learn a feature structure of an existing labeled dataset and migrates the learning to a new dataset, which provides relatively accurate target object segmentation such as organ segmentation to the unlabeled new dataset, thereby effectively improving the generalization performance of the deep network (such as a blood segmentation network) on other datasets.

In order to improve the segmentation accuracy, the unsupervised adaption training method in this embodiment of this application can train a generative adversarial network including a segmentation network (namely, a generator); then, use the generator in the trained generative adversarial network to obtain the optical flow motion information from a labeled medical image to an unlabeled medical image, so as to segment the unlabeled medical image.

Specifically, the computer device may use a labeled sample image and an unlabeled sample image to train an image segmentation network including a first generative adversarial network and a second generative adversarial network. The first generative adversarial network includes a first object segmentation network (namely, a first generator), and the second generative adversarial network includes a second object segmentation network (namely, a second generator). The first generator is used to learn the optical flow motion information when an image is actually segmented.

Figure 3A:
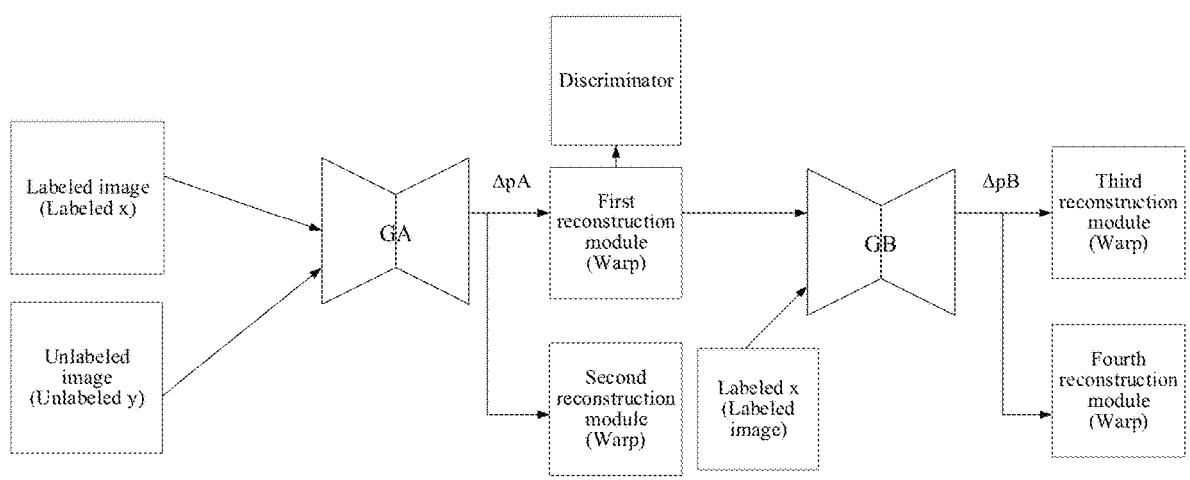
FIG. 3A is an architecture diagram of a segmentation network according to an embodiment of this application.

Referring to FIG. 3A, a segmentation network is provided. The segmentation network includes a first generative adversarial network and a second generative adversarial network. The first generative adversarial network includes a first object segmentation network (namely, the first generator $G_A$), a discriminator, a first reconstruction module, and a second reconstruction module. The second generative adversarial network includes a second object segmentation network (namely, the second generator $G_B$), a third reconstruction module, and a fourth reconstruction module.

Figure 3B:
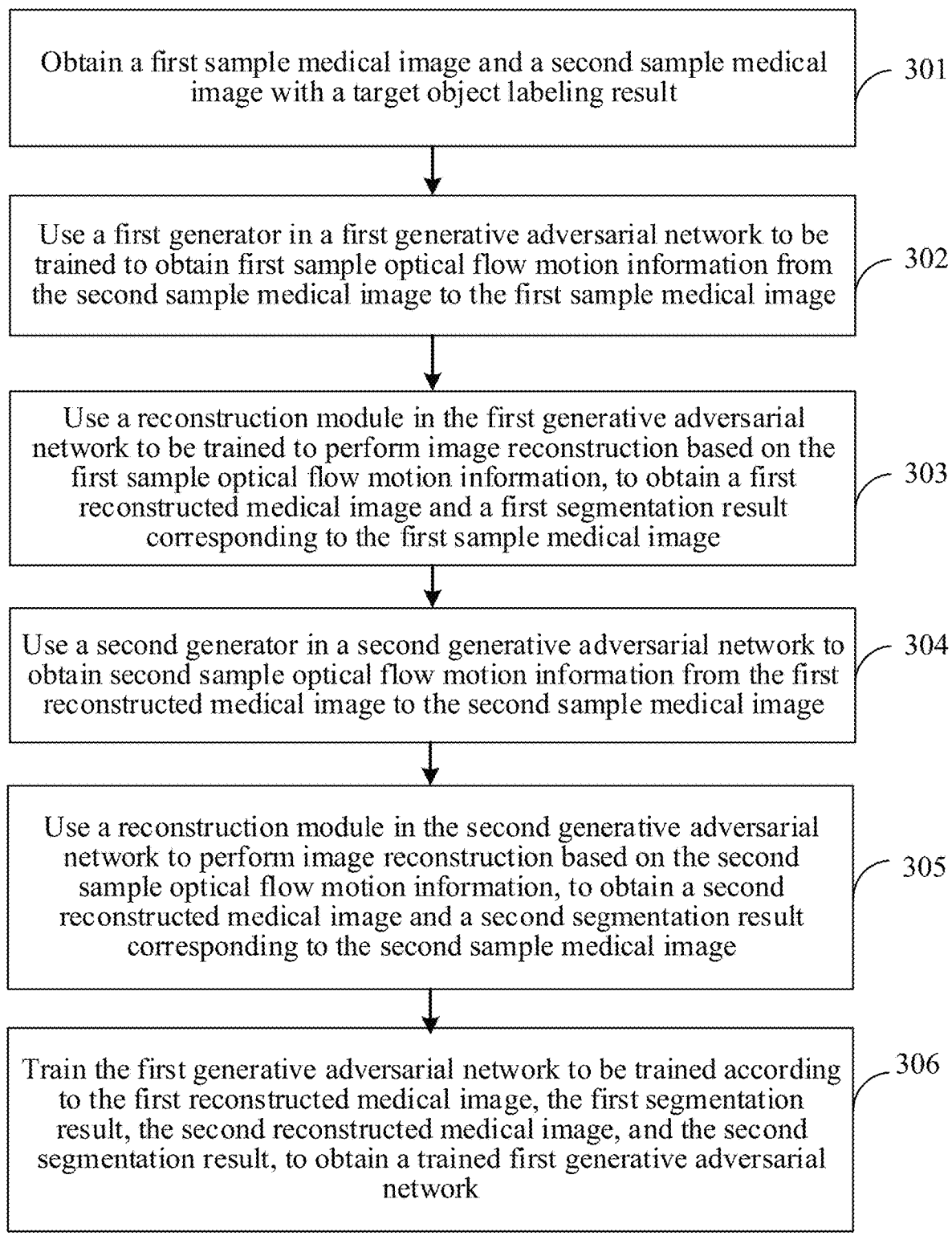
FIG. 3B is a schematic flowchart of a training method according to an embodiment of this application.

As shown in FIG. 3B, a specific process of training the first generative adversarial network is as follows:

Step 301. Obtain a first sample medical image and a second sample medical image with a target object labeling result.

The first sample medical image $y_{sample}$ is a medical image without a labeled target object (such as an organ) region, and may be acquired by a medical image acquisition device. The second sample medical image $x_{sample}$ is a medical image with a labeled target object (such as an organ) region, and may be obtained by a medical staff labeling the target object such as the organ on the medical image.

Step 302. Use a first generator in a first generative adversarial network to be trained to obtain first sample optical flow motion information from the second sample medical image to the first sample medical image.

For example, the computer device may use the first generator $G_A$ to learn a pixel interaction relationship between the second sample medical image $x_{sample}$ and the first sample medical image $y_{sample}$, so as to learn the first sample optical flow motion information $\Delta p_A$ from the second sample medical image $x_{sample}$ to the first sample medical image $y_{sample}$.

The specific process of the first generator obtaining the first sample optical flow motion information may refer to the process of obtaining the optical flow motion information described in the foregoing embodiments. The structure of the first generator may refer to FIG. 2B described above.

Step 303. Use a reconstruction module in the first generative adversarial network to be trained to perform image reconstruction based on the first sample optical flow motion information, to obtain a first reconstructed medical image and a first segmentation result corresponding to the first sample medical image.

Specifically, the image reconstruction may refer to the description of the foregoing embodiments.

For example, the computer device may move the pixels in the labeled second sample medical image $x_{sample}$ according to the first sample optical flow motion information $\Delta p_A$, to reconstruct the unlabeled first sample medical image, so as to obtain the first reconstructed medical image $\bar{y}$. The computer device may move the pixels in the target object labeling region $x_s$ of the second sample medical image $x_{sample}$ according to the first sample optical flow motion information $\Delta p_A$, to reconstruct a target object segmentation region $\bar{y}_s$ of the first sample medical image $y_{sample}$.

In order to enable the optical flow motion information $\Delta p$ to be applied to the original medical image (since the optical flow motion information Δp may be obtained under a setting of downsampling), and improve a reconstruction speed, in an embodiment, trilinear interpolation may be performed on the optical flow motion information. The unlabeled first sample medical image is reconstructed based on the processed optical flow motion information, to obtain the first reconstructed medical image.

For example, an interpolation operation is performed on the optical flow motion information in each preset direction based on the kernel of the trilinear interpolation, to obtain the processed optical flow motion information. The processed optical flow motion information is the optical flow motion information realized by the trilinear interpolation.

Since $\Delta p_A$ is typically small, in an embodiment of this application, the trilinear interpolation is used to realize it. A target position of each position $p_0$ in the original medical image is $p=p_0+\Delta p$. In an embodiment of this application, this process is expressed as:

$$\bar{y}(p) = \sum_q F(q, p) \cdot x(q),$$

where F is the kernel of the trilinear interpolation, and it operates on the x-axis, y-axis, z-axis at the same time. It is expressed as follows:

$$F(q, p) = f(q_x, p_x) \cdot f(q_y, p_y) \cdot f(q_z, p_z)$$

Herein, let $f(a, b)=\max(0,1-|a-b|)$. Since most elements of $F(q, p)$ are 0, a calculation speed is very fast.

In an embodiment of this application, trilinear interpolation may be performed on the learned optical flow motion information Δp each time of reconstructing an image (for example, reconstructing an unlabeled image or a labeled image). The image is reconstructed based on the processed information, which improves the reconstruction speed and efficiency.

Similarly, in an embodiment of this application, trilinear interpolation may be performed on the learned optical flow motion information Δp each time of reconstructing a segmentation object region (for example, reconstructing a segmentation object region of an unlabeled medical image or a segmentation object region of a labeled medical image). The segmentation object region is reconstructed based on the processed information, which improves the reconstruction speed and efficiency.

Step 304. Use a second generator in a second generative adversarial network to obtain second sample optical flow motion information from the first reconstructed medical image to the second sample medical image.

Similarly, the way in which the second generator obtains the optical flow motion information and the structure of the generator may refer to the description of the foregoing embodiments.

For example, the computer device may use the second generator $G_B$ to learn a pixel interaction relationship between the second sample medical image $x_{sample}$ and the first reconstructed medical image $\bar{y}$, so as to learn the optical flow motion information $\Delta p_B$ from the first reconstructed medical image $\bar{y}$ to the second sample medical image $x_{sample}$.

Step 305. Use a reconstruction module in the second generative adversarial network to perform image reconstruction based on the second sample optical flow motion information, to obtain a second reconstructed medical image and a second segmentation result corresponding to the second sample medical image.

For example, the pixels in the first reconstructed medical image $\hat{y}$ are moved according to the second sample optical flow motion information $\Delta p_B$, to reconstruct the labeled medical image, so as to obtain the second reconstructed medical image $\hat{x}$. The pixels in the reconstructed target object segmentation region $\bar{y}_s$ are moved according to the second sample optical flow motion information $\Delta p_B$, to reconstruct a target object segmentation region $\hat{x}_s$ of the second sample medical image $x_{sample}$.

Step 306. Train the first generative adversarial network to be trained according to the first reconstructed medical image, the first segmentation result, the second reconstructed medical image, and the second segmentation result, to obtain a trained first generative adversarial network.

In theory, the first generator $G_A$ can capture the optical flow motion information $\Delta p_A$ from the second sample medical image $x_{sample}$ to the first sample medical image $y_{sample}$. However, there exist thousands of ways from X→Y. In order to ensure the uniqueness of this mapping, in an embodiment of this application, it is expected to reconstruct the labeled image by learning the data relationship between the first reconstructed medical image $\bar{y}$ and the second sample medical image $x_{sample}$. Similarly, after obtaining the reconstructed unlabeled image $\bar{y}$, the computer device may use the second generator $G_B$ to learn the pixel interaction relationship between first reconstructed medical image $\bar{y}$ and second sample medical image $x_{sample}$, so as to learn the optical flow motion information $\Delta p_B$. $\hat{x}$ represents the reconstructed labeled image based on the optical flow motion information $\Delta p_B$.

Specifically, the image reconstruction process is expressed by the following formula:

$$\Delta p_B = G_B(\bar{y}, x)$$

$$\hat{x} = \bar{y} \circ \Delta p_B$$

Similarly, in an embodiment of this application, the optical flow motion information may also be applied to the segmentation space, to obtain the segmentation $\bar{y}_s$ of the reconstructed unlabeled image and the segmentation $\hat{x}_s$ of the reconstructed labeled image. The formulas are expressed as follows:

$$\bar{y}_s = x_s \circ \Delta p_A$$

$$\hat{x}_s = \bar{y}_s \circ \Delta p_B$$

In this embodiment of this application, the network is trained through multiple times of image reconstruction, and multiple times of segmentation result reconstruction of the segmentation space, which improves the accuracy of $G_A$ learning the optical flow motion information. During the training process, in order to improve the accuracy of image reconstruction and segmentation reconstruction, thereby enhancing the accuracy of a trained generator capturing motion information, a reconstruction consistency loss in the image reconstruction space may be constructed for ensuring the accuracy of image reconstruction, and a segmentation consistency loss in the segmentation space may be constructed for ensuring the accuracy of image segmentation.

For example, in an embodiment, the step "train the first generative adversarial network to be trained according to the first reconstructed medical image, the first segmentation result, the second reconstructed medical image, and the second segmentation result, to obtain a trained first generative adversarial network" may include:

Step S1. Obtain a reconstruction consistency loss in an image reconstruction space according to the first reconstructed medical image and the second reconstructed medical image.

The reconstruction consistency loss includes at least one of an image reconstruction consistency loss during the image reconstruction process and a trajectory consistency loss of the optical flow motion information.

For example, referring to FIG. 3A, in an embodiment of this application, after the process from the second sample medical image $x_{sample}$ to the unlabeled first reconstructed medical image $\bar{y}$ that has been reconstructed, and then to the labeled second reconstructed medical image $\hat{x}$ that has been reconstructed (namely $x \rightarrow \bar{y} \rightarrow \hat{x}$), the second reconstructed medical image $\hat{x}$ is expected to be consistent with the original second sample medical image $x_{sample}$ with the target object labeling result. Accordingly, the image reconstruction consistency loss is constructed.

Specifically, the computer device may obtain the image consistency loss that the second sample medical image maintains a consistency with the second reconstructed medical image according to the second reconstructed medical image and the second sample medical image. For example, referring to FIG. 3A, the image reconstruction consistency loss between the second reconstructed medical image $\hat{x}$ and the second sample medical image $x_{sample}$ may be calculated using a consistency loss function.

In another example, referring to FIG. 3A, in order to constrain the optical flow motion information of $x \rightarrow \hat{y}$ and $\bar{y} \rightarrow \hat{x}$, in an embodiment of this application, $\Delta p_A$ and $\Delta p_B$ are expected to be in a pixel-level trajectory consistency. Accordingly, the trajectory consistency loss $L_{tra}$ that ensures $\Delta p_A$ and $\Delta p_B$ to be in the trajectory consistency is constructed.

The trajectory consistency loss that the first sample optical flow motion information is in a trajectory consistency with the second sample optical flow motion information is obtained according to the first sample optical flow motion information and the second sample optical flow motion information. For example, the trajectory consistency loss $L_{tra}$ between $\Delta p_A$ and $\Delta p_B$ is calculated using a preset trajectory consistency loss function.

In an embodiment, an image may be generated in order to precisely and conveniently calculate the trajectory consistency loss. The computer device may apply the two pieces of the optical flow motion information to the original medical image for image transformation, calculate a transformation loss between the transformed image and the original medical image, and obtain the trajectory consistency loss based on the transformation loss.

Specifically, the step of obtaining the trajectory consistency loss that the first sample optical flow motion information and the second sample optical flow motion information are in the trajectory consistency according to the first sample optical flow motion information and the second sample optical flow motion information may include: generating an original medical image; transforming the original medical image according to the first sample optical flow motion information and the second sample optical flow motion information, to obtain a transformed medical image; obtaining a transformation loss between the transformed medical image and the original medical image; and using the transformation loss as the trajectory consistency loss that the first sample optical flow motion information is in a trajectory consistency with the second sample optical flow motion information.

Figure 3C:
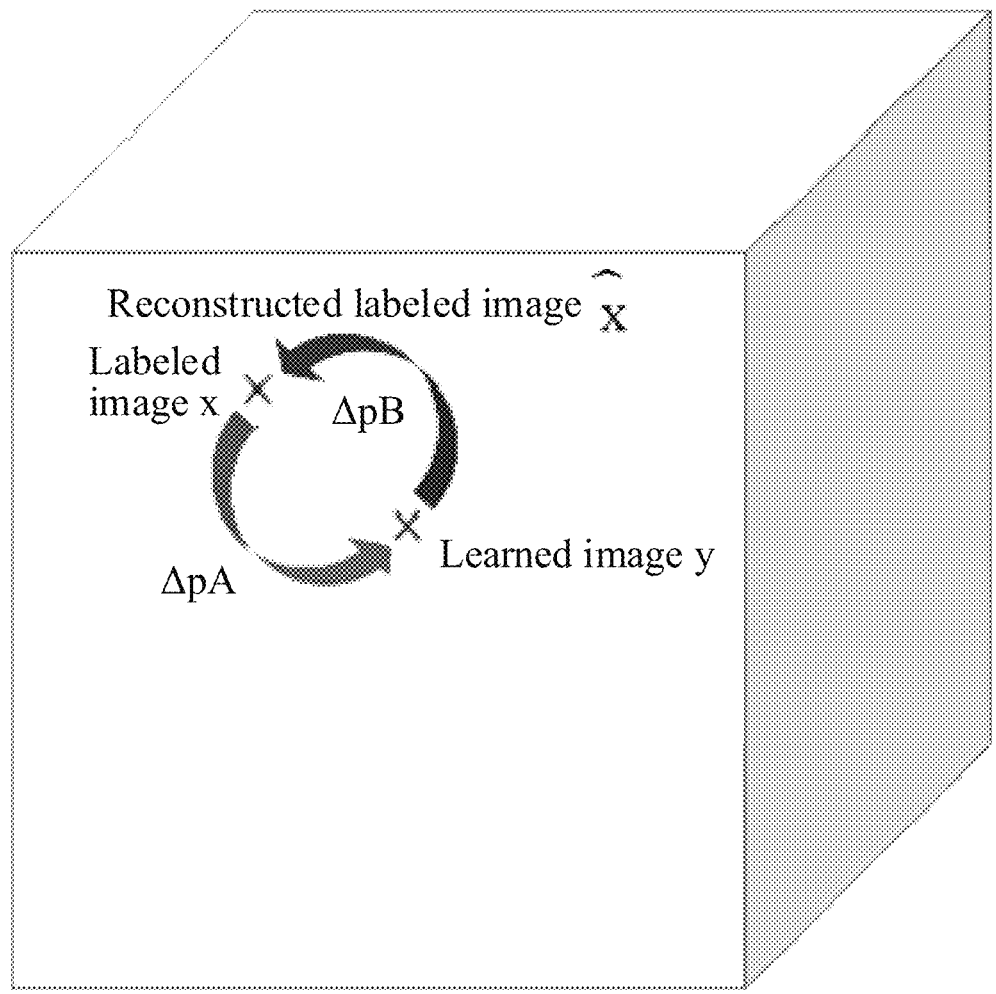
FIG. 3C is a schematic diagram of optical flow motion information consistency according to an embodiment of this application.

As shown in FIG. 3C, in order to realize the constraint information that $\Delta p_A$ and $\Delta p_B$ are in the pixel-level trajectory consistency, an original medical image $r^{h*w*c} \sim N(0, I)$ is randomly constructed. In an embodiment of this application, the pieces of the optical flow motion information $\Delta p_A$ and $\Delta p_B$ are applied on the medical original image. A reconstructed image $\hat{r}$ is expected to be in consistency with the original medical image $r$ after this pair of transformations.

Besides, in some embodiments, other losses that maintain the image construction consistency may be constructed, to improve the accuracy of image reconstruction, thereby improving the segmentation accuracy.

Step S2. Obtain a segmentation consistency loss in a segmentation space according to the first segmentation result, the second segmentation result, and the target object labeling result of the second sample medical image.

The segmentation consistency loss is a loss that the reconstructed target object segmentation result in the segmentation space maintains a consistency with the labeled target object segmentation result. The reconstructed target object segmentation result and the labeled target object segmentation result may be consistent in terms of image segmentation, mask value, semantics, and the like. That is, the segmentation consistency loss includes an image segmentation consistency loss, mask value losses, and a semantic consistency loss.

For example, referring to FIG. 3A, in order to achieve the consistency in the segmentation space $x_s \rightarrow \bar{y}_s \rightarrow \hat{x}_s$, so as to allow $x_s$ to maintain the consistency with $\hat{x}_s$, the image segmentation consistency loss may be designed. Specifically, the computer device may obtain the image segmentation consistency loss that the target object labeling result maintains the consistency with the second segmentation result according to the second segmentation result and the target object labeling result. For example, the difference between $x_s$ and $\hat{x}_s$ may be calculated, to obtain the image segmentation consistency loss.

In another example, in order to ensure that segmentation mask values obtained by using optical flow motion information in the segmentation space are close to a preset segmentation mask value $\{0,1\}$ the computer device may introduce the mask value losses, to encourage segmentation mask values of obtained segmentation results to be close to the preset segmentation mask value, such as 0 or 1. In an embodiment, since the segmentation mask values are close to 0 or 1, the mask value losses may be called hash losses.

The segmentation mask values may include pixel values of the segmentation results, such as pixel values of an organ segmentation image.

In an embodiment, in order to ensure that the segmentation masks such as $\bar{y}_s$, $\hat{x}_s$ that are reconstructed based on the optical flow motion information are consistent with the original segmentation $x_s$ in terms of size, $\bar{y}_s$, $\hat{x}_s$ may be further constrained. Specifically, the computer device may construct constraint conditions that the first segmentation result and the second segmentation result are consistent with the target object labeling result in terms of size, to obtain constraint conditions corresponding to the mask value losses. During training, the network may be trained according to the mask value losses and the corresponding constraint conditions.

In an embodiment, it is further expected that the segmentation result, such as the segmentation mask $\bar{y}_s$, learned by the network also has a semantic consistency across the image. For example, each pixel value in the learned segmentation mask $\bar{y}_s$ maintains the consistency, so that the target object segmentation region, such as the organ region, can be easily recognized during observation. Accordingly, a semantic consistency loss is introduced in an embodiment of this application. Specifically, the semantic consistency loss that the first segmentation result maintains the semantic consistency across the image can be constructed based on the first segmentation result. In an embodiment, the semantic consistency may be regarded as smooth appearance. Therefore, the semantic consistency loss may also be called an appearance smooth loss.

In an embodiment, in order to maintain the semantic consistency, it is necessary to ensure that numerical distribution within the target object region such as the organ is observed to be consistent. Therefore, the computer device may derive the pixel values in the segmentation result image, to calculate the loss that ensures the consistency of the numerical distribution of the target object region in the segmentation result image.

For example, the computer device may derive the pixel values in the first segmentation result along a preset direction, to obtain a derivation result of the preset direction; construct the semantic consistency loss that the first segmentation result maintains the semantic consistency across the image according to the derivation result of the preset direction and the first segmentation result.

For example, the segmentation mask $\bar{y}_s$ is derived along x-axis, y-axis, z-axis respectively, to obtain $\Delta y_{x\text{-}axis}$, $\Delta y_{y\text{-}axis}$, $\Delta y_{z\text{-}axis}$. The appearance smooth loss is calculated based on the derivation result.

In the embodiments of this application, the segmentation consistency loss in the segmentation space and the reconstruction consistency loss in the image reconstruction space are not limited to those described above. The reconstruction consistency loss or the segmentation consistency loss of any other type may be further designed according to requirements.

Step S3. Train the first generative adversarial network to be trained according to the reconstruction consistency loss and the segmentation consistency loss, to obtain the trained first generative adversarial network.

In an embodiment, in order to improve the segmentation accuracy of the network, the first generative adversarial network may be alternatively trained in a generative adversarial training manner. For example, the method according to an embodiment of this application may further include: using a discriminator in the first generative adversarial network to discriminate the first sample medical image and the first reconstructed medical image, to obtain a discrimination result; and obtaining an adversarial loss of the first generative adversarial network according to the first reconstructed medical image and the discrimination result. In this case, in an embodiment of this application, the first generative adversarial network to be trained may be trained according to the adversarial loss, the reconstruction consistency loss, and the segmentation consistency loss, to obtain the trained first generative adversarial network.

In an embodiment, the adversarial loss may include a maximum adversarial loss and a minimum adversarial loss. Specifically, the reconstruction loss may be calculated according to the first reconstructed medical image and the first sample medical image, and the discrimination loss may be calculated according to the discrimination result. The maximum adversarial loss and the minimum adversarial loss that construct the first generative adversarial network are calculated according to the reconstruction loss and the discrimination loss. In this case, in an embodiment of this application, iterative training may be performed on the first generative adversarial network based on the minimum adversarial loss and the maximum adversarial loss, the reconstruction consistency loss, and the segmentation consistency loss, to obtain the trained first generative adversarial network.

For example, referring to FIG. 3A, the first generator $G_A$ is expected to precisely learn the optical flow motion information from the labeled image to the unlabeled image, while the discriminator D is expected to discriminate the first reconstructed medical image $\bar{y}$ from the real unlabeled first medical image y. In this way, a confrontation is formed between the first generator $G_A$ and the discriminator D. The first generator $G_A$ is intended to reconstruct with the minimum loss, and the discriminator is intended to distinguish with the maximum loss. Therefore, the network can be trained with the maximum loss and the minimum loss.

From the above, the embodiments of this application propose to train the image segmentation network in the unsupervised generative adversarial training manner, which effectively improves the generalization performance of the model on other datasets, and also enables the generator to accurately learn the optical flow motion information, thereby enhancing the accuracy of image segmentation.

For example, after the above-mentioned training of the first generative adversarial network, the first generator in the first generative adversarial network can be used to precisely learn the optical flow motion information from the labeled second medical image to the unlabeled first medical image, so as to segment the target object in the unlabeled first medical image based on the optical flow motion information, thereby greatly improving the segmentation accuracy.

According to the method described in the foregoing embodiments, the following further provides detailed descriptions by using examples.

In this embodiment, the medical image segmentation apparatus is specifically integrated in a computer device as an example for description.

(I) Training of a Segmentation Network

Figure 4A:
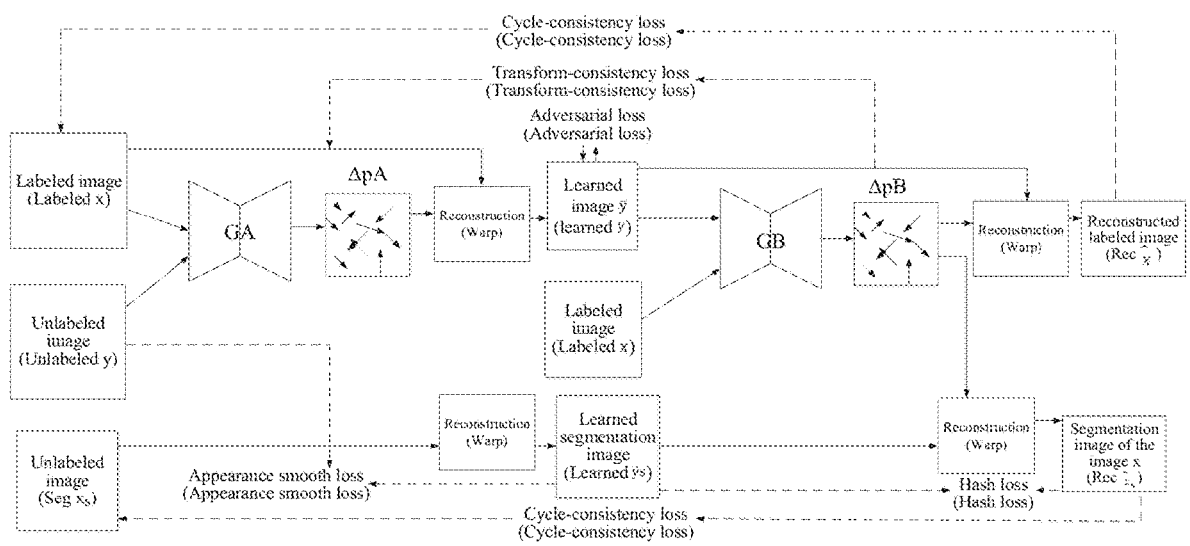
FIG. 4A is another architecture diagram of a segmentation network according to an embodiment of this application.

According to the description of FIG. 3A, FIG. 4A provides a schematic architectural diagram of a segmentation network, including a first generator $G_A$, a second generator $G_B$, and multiple Warp (reconstruction) modules.

(1) Firstly, the computer device obtains a labeled image x with a labeled target object such as an organ, and an unlabeled image y. Referring to FIG. 4A, assuming that $x \in R^{h*w*c}$ is a labeled medical image, $x_s \in R^{h*w*c}$ is its corresponding labeling, and h, w, and c are dimensions of the medical image in the coronal, sagittal and axial directions respectively. Assuming that the dataset Data=$\{y_i\}_{i=1}^n$ is a dataset including a large number of unlabeled medical images.

The first generator in the network shown in FIG. 4A is used to learn the pixel interaction relationship between the labeled image x and the unlabeled image y, so as to learn the optical flow motion information $\Delta p_A \in R^{h*w*c*3}$. Then, the unlabeled image is reconstructed as $\bar{y}$ based on the optical flow motion information $\Delta p_A$ by the Warp. The segmentation image of the unlabeled image is reconstructed as $\bar{y}_s$ based on the optical flow motion information $\Delta p_A$ by the Warp.

After the reconstructed unlabeled image $\bar{y}$ is obtained, the generator $G_B$ may be used to learn the pixel interaction relationship between the reconstructed image $\bar{y}$ and the labeled image x, so as to learn the optical flow motion information $\Delta p_B$. The labeled image is reconstructed as $\hat{x}$ based on the optical flow motion information $\Delta p_B$ by the Warp, and the segmentation image of the labeled image x is reconstructed as $\hat{x}_s$ based on the optical flow motion information $\Delta p_B$ by the Warp.

(2) The computer device calculates losses based on reconstruction results.

For example, the losses are calculated according to a preset loss functions and the reconstruction results. Regarding the reconstruction consistency loss in the image reconstruction space and the segmentation consistency loss in the segmentation space described in the foregoing embodiments, in an embodiment of this application, the following losses and loss functions are introduced:

(2.1) Adversarial Loss

In order to make the reconstructed image sufficiently close to a target domain, the adversarial loss is introduced in an embodiment of this application. The specific formula is as follows:

$$\mathcal{L}_{GAN}(G_A, D) = \mathbb{E}_{y \sim p_d(y)}[\|D(y)\|] + \mathbb{E}_{x \sim p_d(x), y \sim p_d(y)}[\|D(x \circ G_A(x, y)) - 1\|]$$

Herein, the generator $G_A$ is intended to precisely learn the optical flow motion information from the labeled image to the unlabeled image, while the discriminator D is intended to distinguish the reconstructed image $\bar{y}$ from the real unlabeled image y. As such, a confrontation is formed between the generator $G_A$ and the discriminator D. The generator $G_A$ is intended to reconstruct with the minimum loss, while the discriminator is intended to distinguish with the maximum loss, namely $\min_{G_A} \max_D \mathcal{L}_{GAN}(G_A, D)$.

(2.2) Cycle-Consistency Loss

After the process from the labeled image x to the reconstructed unlabeled image $\bar{y}$, and then to the reconstructed labeled image $\hat{x}$ (namely, $x \to \bar{y} \to \hat{x}$), the reconstructed labeled image $\hat{x}$ is expected to be consistent with the original labeled image x. In addition, it is also expected to achieve consistency $x_s \to \bar{y}_s \to \hat{x}_s$ in the segmentation space. The cycle-consistency loss is introduced as follows:

$$\mathcal{L}_{cyc}(G_A, G_B) = \mathbb{E}_{x \sim p_d(x), y \sim p_d(y)}$$
$$[\|(x \circ \Delta p_A) \circ \Delta p_B - x\|] + [\|(x_s \circ \Delta p_A) \circ \Delta p_B - x_s\|]$$

(2.3) Trajectory Consistency Loss

Besides, in order constrain the optical flow motion information of $x \to \bar{y}$ and $\bar{y} \to \hat{x}$, in an embodiment of this application, $\Delta p_A$ and $\Delta p_B$ are expected to be in the pixel-level trajectory consistency, as shown in FIG. 3C. In order to achieve this constraint information, an image $r^{h*w*c} \sim N(0, I)$ may be randomly constructed. In an embodiment of this application, the pieces of the optical flow motion information $\Delta p_A$ and $\Delta p_B$ are applied on the image, and a reconstructed imager $\hat{r}$ is expected to be in consistency with the original medical image r after this pair of transformations. The entire process is expressed by the following formula.

$$r \sim N(0, I)$$

$$\mathcal{L}_{tra}(G_A, G_B) = \mathbb{E}_{x \sim p_d(x), y \sim p_d(y)}[\|(r \circ \Delta p_A) \circ \Delta p_B - r\|]$$

(2.4) Regular Loss

In order to ensure that the segmentation mask value obtained by using the optical flow motion information in the segmentation space belongs to {0,1}, in an embodiment of this application, a hash loss is introduced to encourage the segmentation mask value to be as close as possible to 0 or 1. In addition, in an embodiment of this application, the learned segmentation masks $\bar{y}_s$, $\hat{x}_s$ are expected to be consistent with the original segmentation $x_s$ in terms of size. In an embodiment of this application, a constraint is imposed on $\bar{y}_s$, $\hat{x}_s$. The entire formula is expressed as follows.

$$\mathcal{L}_{hash} = \mathbb{E}|-\|y_x - 0.5\| + 0.5| + \mathbb{E}|-\|\hat{x}_s - 0.5\| + 0.5|$$
$$\text{s.t.} \sum \bar{y}_s = \sum x_s$$
$$\sum \hat{x}_s = \sum x_s$$

In addition, in an embodiment of this application, it is expected that the learned segmentation mask $\bar{y}_s$ also has the semantic consistency across the image. For this reason, in an embodiment of this application, the numerical distribution within the organ is observed to be consistent. In an embodiment of this application, the image is derived along x-axis, y-axis, z-axis respectively, to obtain $\Delta y_{x-axis}$, $\Delta y_{y-axis}$, $\Delta y_{z-axis}$. In an embodiment of this application, the segmentation mask $\bar{y}_s$ is expected to be consistent with the image in organ differentiation. Accordingly, in an embodiment of this application, the following loss is designed:

$$\mathcal{L}_{smooth} = \mathbb{E}[\|\bar{y}_s \cdot \Delta y_{x-axis}\|]$$
$$+ \mathbb{E}[\|\bar{y}_s \cdot \Delta y_{y-axis}\|]$$
$$+ \mathbb{E}[\|\bar{y}_s \cdot \Delta y_{z-axis}\|]$$

(3) The computer device trains the network according to the above calculated losses, to obtain the trained first generative adversarial network.

(II) A target object such as an organ in a medical image to be segmented is segmented by a generator in the trained first generative adversarial network.

Figure 4B:
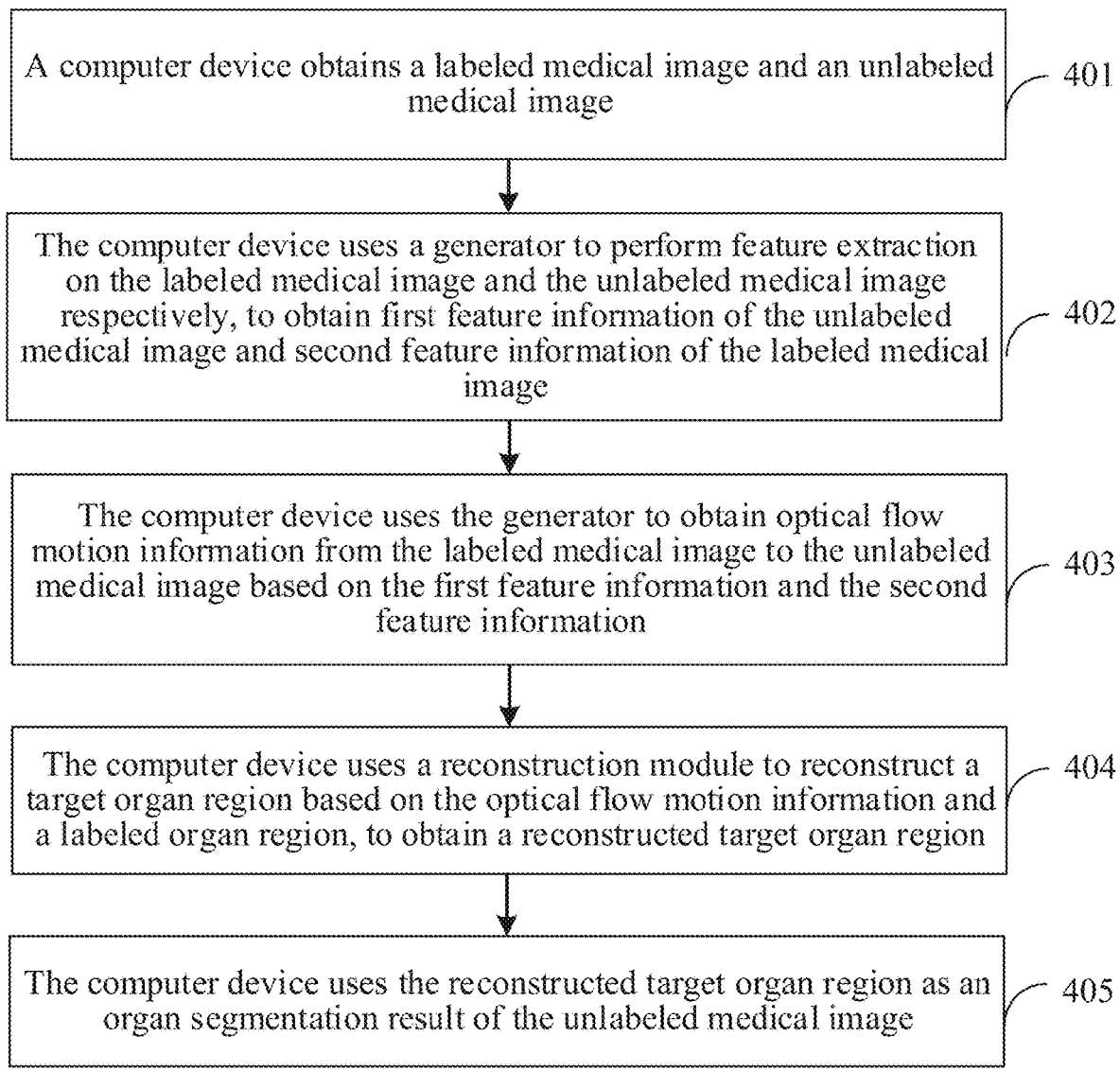
FIG. 4B is another schematic flowchart of a medical image segmentation method according to an embodiment of this application.

As shown in FIG. 4B, as an example, the target object is an organ. The specific process of a medical image segmentation method is as follows:

Step 401. A computer device obtains a labeled medical image and an unlabeled medical image.

The labeled medical image is a medical image with a labeled target organ, and the unlabeled medical image may be obtained from an unlabeled image dataset.

Step 402. The computer device uses a generator to perform feature extraction on the labeled medical image and the unlabeled medical image respectively, to obtain first feature information of the unlabeled medical image and second feature information of the labeled medical image.

For example, referring to FIG. 2B, the generator may perform feature extraction on the labeled medical image and the unlabeled medical image through multiple convolutional layers. A specific feature extraction process refers to the description of the foregoing embodiments.

Step 403. The computer device uses the generator to obtain optical flow motion information from the labeled medical image to the unlabeled medical image based on the first feature information and the second feature information.

Specifically, the specific process of the generator learning the optical flow motion information may refer to the description of the foregoing embodiments, for example, performing a non-local operation. For example, reference may be made to the process shown in FIG. 2B.

Step 404. The computer device uses a reconstruction module to reconstruct a target organ region based on the optical flow motion information and a labeled organ region, to obtain a reconstructed target organ region.

For example, pixels in the labeled organ region are moved in a segmentation space based on the optical flow motion information Δp, to form the reconstructed target organ region, which can be used as an organ segmentation region of the unlabeled image.

Step 405. The computer device uses the reconstructed target organ region as an organ segmentation result of the unlabeled medical image.

From the above, the solution provided in the embodiments of this application can migrate object segmentation such as organ segmentation of the labeled image to the unlabeled image by learning the transformation from the labeled image to the unlabeled image. Target object segmentation such as organ segmentation is performed on the unlabeled medical image by using the labeled medical image, which avoids the use of large amounts of labeled data to train a segmentation model in a conventional solution. Only one labeled image and one image to be segmented need to be provided, so as to realize the segmentation of the image to be segmented, thereby greatly improving the precision and efficiency of the medical image segmentation.

In order to better implement the above method, an embodiment of this application further provides a medical image segmentation apparatus, which may be integrated in a computer device, such as a server or a terminal.

Figure 5A:
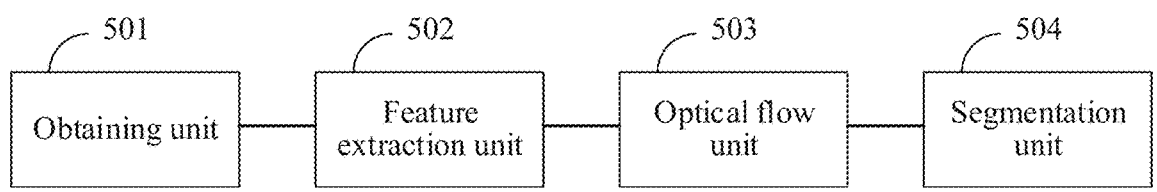
FIG. 5A is a schematic structural diagram of a medical image segmentation $apparatus according to an embodiment of this application.

For example, as shown in FIG. 5A, the medical image segmentation apparatus may include an obtaining unit 501, a feature extraction unit 502, an optical flow unit 503, and a segmentation unit 504. In the present disclosure, a unit may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

In the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

The obtaining unit 501 is configured to obtain a first medical image and a second medical image with a labeled target object region.

The feature extraction unit 502 is configured to perform feature extraction on the first medical image and the second medical image respectively, to obtain first feature information of the first medical image and second feature information of the second medical image.

The optical flow unit 503 is configured to obtain optical flow motion information from the second medical image to the first medical image according to the first feature information and the second feature information.

The segmentation unit 504 is configured to segment a target object in the first medical image according to the optical flow motion information and the labeled target object region, to obtain a segmentation result of the first medical image.

Figure 5B:
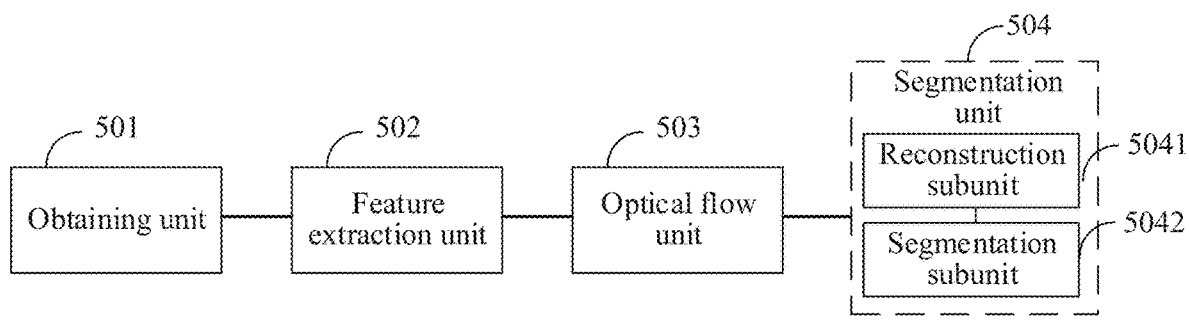
FIG. 5B is another schematic structural diagram of a medical image segmentation apparatus according to an embodiment of this application.

In an embodiment, referring to FIG. 5B, the segmentation unit 504 includes:
  a reconstruction subunit 5041, configured to perform target object region reconstruction according to the optical flow motion information and the labeled target object region, to obtain a reconstructed target object region; and
  a segmentation subunit 5042, configured to use the reconstructed target object region as the segmentation result of the first medical image.

In an embodiment, the reconstruction subunit 5041 is configured to perform trilinear interpolation on the optical flow motion information, to obtain processed optical flow motion information; and perform target object region reconstruction based on the processed optical flow motion information and the labeled target object region, to obtain the reconstructed target object region.

Figure 5C:
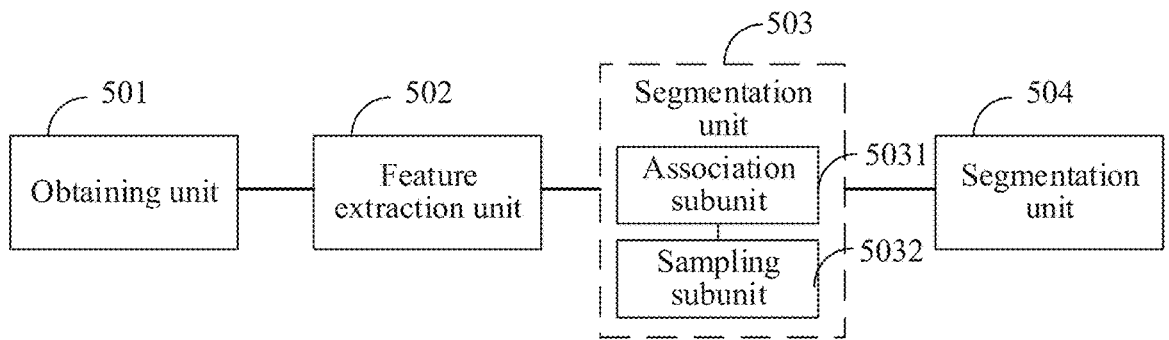
FIG. 5C is another schematic structural diagram of a medical image segmentation apparatus according to an embodiment of this application.

In an embodiment, referring to FIG. 5C, the optical flow unit 503 may include:
  an association subunit 5031, configured to associate the first feature information with the second feature information, to obtain pixel position correspondence information between the second medical image and the first medical image; and
  a sampling subunit 5032, configured to perform an upsampling operation on the pixel position correspondence information, to obtain the optical flow motion information from the second medical image to the first medical image.

In an embodiment, the association subunit 5031 may be specifically configured to: perform a convolution operation on the first feature information of the first medical image, to obtain first convolution feature information; perform a convolution operation on the second feature information of the second medical image, to obtain second convolution feature information; fuse the first convolution feature information and the second convolution feature information, to obtain first fusion feature information; and fuse the first fusion feature information and the first convolution feature information, to obtain the pixel position correspondence information between the second medical image and the first medical image.

In an embodiment, the optical flow unit 503 is specifically configured to: use a first generator in a first generative adversarial network to obtain the optical flow motion information from the second medical image to the first medical image according to the first feature information and the second feature information.

Figure 5D:
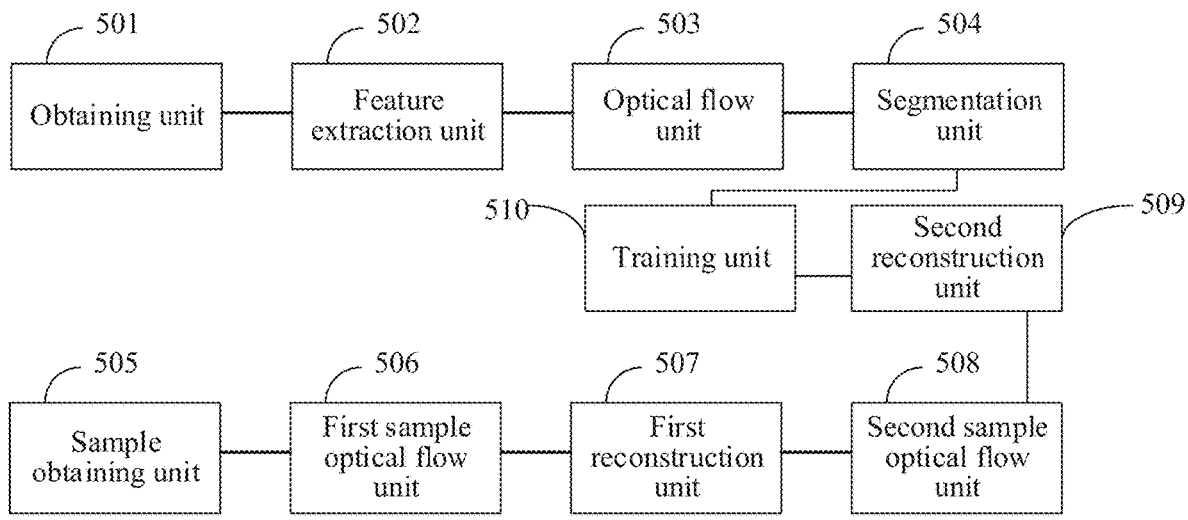
FIG. 5D is another schematic structural diagram of a medical image segmentation apparatus according to an embodiment of this application.

In an embodiment, referring to FIG. 5D, the medical image segmentation apparatus of this application further includes:
- a sample obtaining unit 505, configured to obtain a first sample medical image and a second sample medical image with a target object labeling result;
- a first sample optical flow unit 506, configured to use a first generator in a first generative adversarial network to be trained to obtain first sample optical flow motion information from the second sample medical image to the first sample medical image;
- a first reconstruction unit 507, configured to use a reconstruction module in the first generative adversarial network to be trained to perform image reconstruction based on the first sample optical flow motion information, to obtain a first reconstructed medical image and a first segmentation result corresponding to the first sample medical image;
- a second sample optical flow unit 508, configured to use a second generator in a second generative adversarial network to obtain second sample optical flow motion information from the first reconstructed medical image to the second sample medical image;
- a second reconstruction unit 509, configured to use a reconstruction module in the second generative adversarial network to perform image reconstruction based on second sample optical flow motion information, to obtain a second reconstructed medical image and a second segmentation result corresponding to the second sample medical image; and
- a training unit 510, configured to train the first generative adversarial network to be trained according to the first reconstructed medical image, the first segmentation result, the second reconstructed medical image, and the second segmentation result, to obtain a trained first generative adversarial network.

Figure 5E:
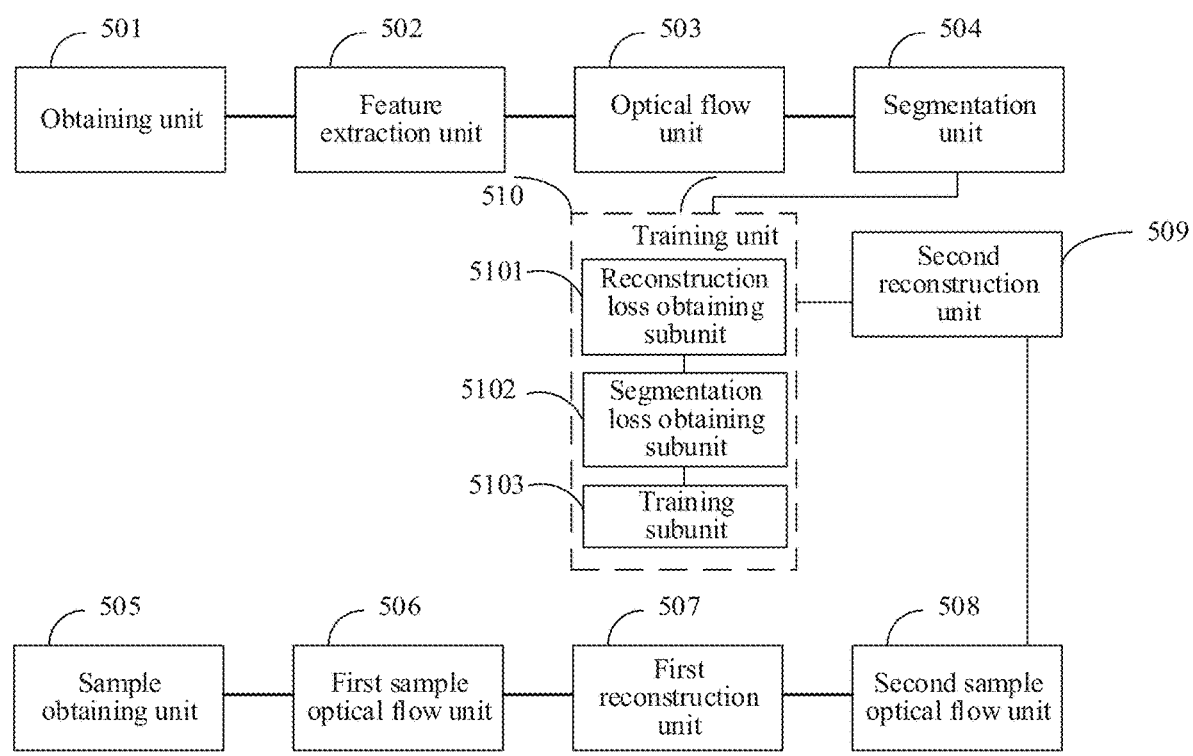
FIG. 5E is another schematic structural diagram of a medical image segmentation apparatus according to an embodiment of this application.

In an embodiment, referring to FIG. 5E, the training unit 510 may include:
- a reconstruction loss obtaining subunit 5101, configured to obtain a reconstruction consistency loss in an image reconstruction space according to the first reconstructed medical image and the second reconstructed medical image;
- a segmentation loss obtaining subunit 5102, configured to obtain a segmentation consistency loss in a segmentation space according to the first segmentation result, the second segmentation result, and the target object labeling result of the second sample medical image; and
- a training subunit, configured to train the first generative adversarial network to be trained according to the reconstruction consistency loss and the segmentation consistency loss, to obtain the trained first generative adversarial network.

In an embodiment, the reconstruction consistency loss includes an image reconstruction consistency loss and a trajectory consistency loss. The reconstruction loss obtaining subunit 5101 may be specifically configured to: obtain the image reconstruction consistency loss that the second sample medical image maintains a consistency with the second reconstructed medical image according to the second reconstructed medical image and the second sample medical image; and obtain the trajectory consistency loss that the first sample optical flow motion information is in a trajectory consistency with the second sample optical flow motion information according to the first sample optical flow motion information and the second sample optical flow motion information.

In an embodiment, the segmentation consistency loss includes an image segmentation consistency loss, mask value losses, and a semantic consistency loss. The segmentation loss obtaining subunit 5102 is configured to: obtain the image segmentation consistency loss that the target object labeling result maintains a consistency with the second segmentation result according to the second segmentation result and the target object labeling result; respectively obtain the mask value losses of the first segmentation result and the second segmentation result relative to a preset segmentation mask value according to the first segmentation result, the second segmentation result, and the preset segmentation mask value; and construct the semantic consistency loss that the first segmentation result maintains a semantic consistency across the image based on the first segmentation result.

In an embodiment, the segmentation loss obtaining subunit 5102 is configured to: derive pixel values in the first segmentation result along a preset direction, to obtain a derivation result of the preset direction; and construct the semantic consistency loss that the first segmentation result maintains the semantic consistency across the image according to the derivation result of the preset direction and the first segmentation result.

In an embodiment, the reconstruction loss obtaining subunit 5101 may be specifically configured to: generate an original medical image; transform the original medical image according to the first sample optical flow motion information and the second sample optical flow motion information, to obtain a transformed medical image; obtain a transformation loss between the transformed medical image and the original medical image; and use the transformation loss as the trajectory consistency loss that the first sample optical flow motion information is in a trajectory consistency with the second sample optical flow motion information.

Figure 5F:
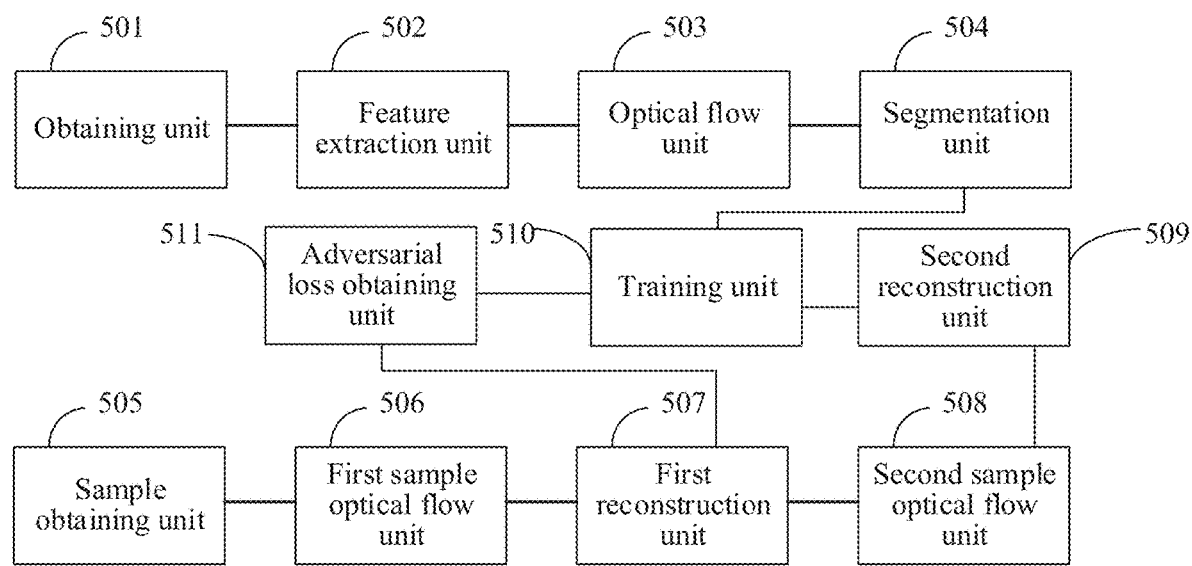
FIG. 5F is another schematic structural diagram of a medical image segmentation apparatus according to an embodiment of this application.

In an embodiment, referring to FIG. 5F, the medical image segmentation apparatus further includes an adversarial loss obtaining unit 511.

The adversarial loss obtaining unit 511 is configured to use a discriminator in the first generative adversarial network to be trained to discriminate the first sample medical image and the first reconstructed medical image, to obtain a discrimination result; and obtain an adversarial loss of the first generative adversarial network according to the first reconstructed medical image and the discrimination result.

The training unit 512 is configured to train the first generative adversarial network to be trained according to the adversarial loss, the reconstruction consistency loss, and the segmentation consistency loss, to obtain the trained first generative adversarial network.

During specific implementations, the foregoing units may be implemented as independent entities, or may be randomly combined, or may be implemented as the same entity or several entities. For specific implementations of the foregoing units, refer to the foregoing method embodiments. Details are not described herein again.

From the above, this embodiment of this application may obtain, by using the obtaining unit 501, a first medical image and a second medical image with a labeled target object region; perform, by using the feature extraction unit 502, feature extraction on the first medical image and the second medical image respectively, to obtain first feature information of the first medical image and second feature information of the second medical image; obtain, by using the optical flow unit 503, optical flow motion information from the second medical image to the first medical image according to the first feature information and the second feature information; and segment, by using the segmentation unit 504, a target object in the first medical image according to the optical flow motion information and the labeled target object region, to obtain a segmentation result of the first medical image. The solution can learn the transformation from the labeled image to the unlabeled image, and migrate object segmentation such as organ segmentation of the labeled image to the unlabeled image. The objection segmentation such as the organ segmentation of the unlabeled image is performed by using the labeled image, which greatly improves the precision and efficiency of the medical image segmentation.

Figure 6:
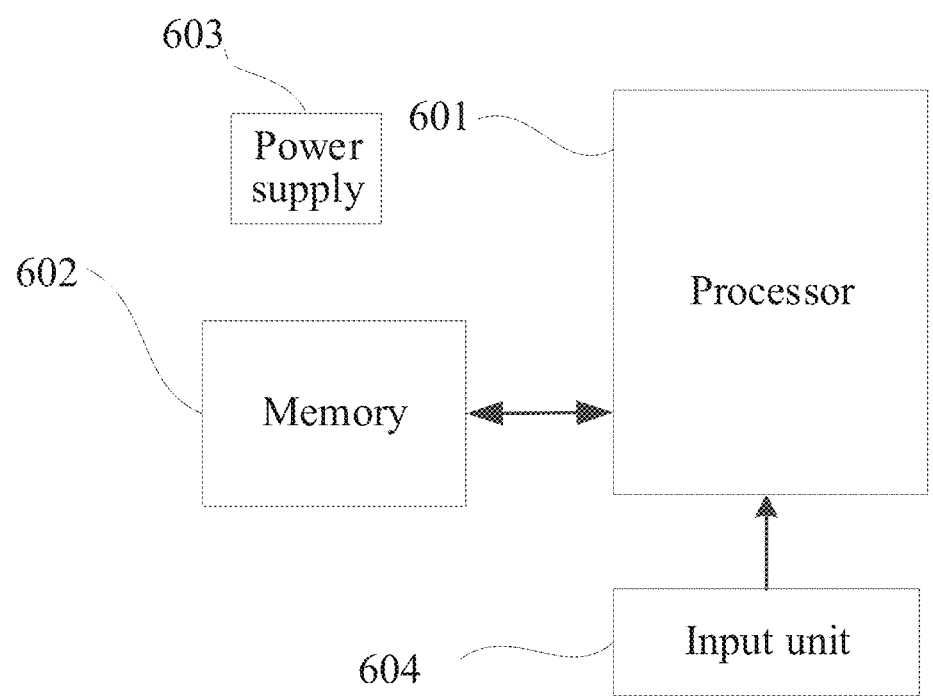
FIG. 6 is a schematic structural diagram of a computer device according to an embodiment of this application.

An embodiment of this application further provides a computer device. FIG. 6 is a schematic structural diagram of a computer device according to an embodiment of this application. Specifically:

The computer device may include components such as a processor 601 of one or more processing cores, a memory 602 of one or more computer-readable storage media, a power supply 603, and an input unit 604. A person of skill in the art can understand that, a structure of the computer device shown in FIG. 6 does not constitute a limitation on the computer device, and may include components that are more or fewer than those shown in the figure, or a combination of some components, or different component arrangements, where:

the processor 601 is a control center of the computer device, and connects to various parts of the entire computer device by using various interfaces and lines. By running or executing software programs and/or modules stored in the memory 602, and invoking data stored in the memory 602, the processor performs various functions and data processing of the computer device, thereby performing overall monitoring on the computer device. Optionally, the processor 601 may include one or more processing cores. Preferably, the processor 601 may integrate an application processor and a modem processor. The application processor mainly processes an operating system, a user interface, an application program, and the like, and the modem processor mainly processes wireless communication. It may be understood that the foregoing modem processor may alternatively not be integrated into the processor 601.

The memory 602 may be configured to store a software program and a module, and the processor 601 runs the software program and the module that are stored in the memory 602, to implement various functional applications and data processing. The memory 602 may mainly include a program storage area and a data storage area. The program storage area may store an operating system, an application program required by at least one function (such as a sound playing function and an image display function), and the like. The data storage area may store data created according to use of the computer device, and the like. In addition, the memory 602 may include a high speed random access memory, and may further include a non-volatile memory, such as at least one magnetic disk storage device, a flash memory device or other non-volatile solid state storage devices. Correspondingly, the memory 602 may further include a memory controller, to allow the processor 601 to access the memory 602.

The computer device further includes the power supply 603 for supplying power to the components. Preferably, the power supply 603 may be logically connected to the processor 601 by using a power management system, thereby implementing functions such as charging, discharging, and power consumption management by using the power management system. The power supply 603 may further include one or more direct current or alternating current power supplies, a re-charging system, a power failure detection circuit, a power supply converter or inverter, a power supply state indicator, and any other component.

The computer device may further include the input unit 604. The input unit 604 may be configured to receive input digit or character information and generate keyboard, mouse, joystick, optical, or trackball signal input related to user settings and function control.

Although not shown in the figure, the computer device may further include a display unit, and the like. Details are not described herein again. Specifically, in this embodiment, the processor 601 in the computer device may load executable files corresponding to processes of one or more application programs to the memory 602 according to the following instructions, and the processor 601 runs the application programs stored in the memory 602, to implement various functions as follows:

obtaining a first medical image and a second medical image with a labeled target object region; performing feature extraction on the first medical image and the second medical image respectively, to obtain first feature information of the first medical image and second feature information of the second medical image; obtaining optical flow motion information from the second medical image to the first medical image according to the first feature information and the second feature information; and segmenting a target object in the first medical image according to the optical flow motion information and the labeled target object region, to obtain a segmentation result of the first medical image.

Refer to the foregoing embodiments for details of the above operations, and details are not described herein again.

From the above, after a first medical image and a second medical image with a labeled target object region are obtained, the computer device according to this embodiment of this application performs feature extraction on the first medical image and the second medical image respectively, to obtain first feature information of the first medical image and second feature information of the second medical image; obtains optical flow motion information from the second medical image to the first medical image according to the first feature information and the second feature information; and segments a target object in the first medical image according to the optical flow motion information and the labeled target object region, to obtain a segmentation result of the first medical image. Therefore, the solution can learn the transformation from the labeled image to the unlabeled image, and migrate object segmentation such as organ segmentation of the labeled image to the unlabeled image. The objection segmentation such as the organ segmentation of the unlabeled image is performed by using the labeled image, which greatly improves the precision and efficiency of the medical image segmentation.

A person of ordinary skill in the art may understand that, all or some steps of the methods in the foregoing embodiments may be implemented through instructions, or implemented through instructions controlling relevant hardware, and the instructions may be stored in a computer-readable storage medium and loaded and executed by a processor.

To this end, an embodiment of this application provides a computer-readable storage medium storing a computer program, and the computer program can be loaded by a processor to perform the steps in any one of medical image segmentation methods according to the embodiments of this application. For example, the computer program may perform the following steps:

obtaining a first medical image and a second medical image with a labeled target object region; performing feature extraction on the first medical image and the second medical image respectively, to obtain first feature information of the first medical image and second feature information of the second medical image; obtaining optical flow motion information from the second medical image to the first medical image according to the first feature information and the second feature information; and segmenting a target object in the first medical image according to the optical flow motion information and the labeled target object region, to obtain a segmentation result of the first medical image.

For specific implementations of the above operations, refer to the foregoing embodiments. Details are not described herein again.

The computer-readable storage medium may include: a read-only memory (ROM), a random access memory (RAM), a magnetic disk, an optical disc or the like.

Because the instructions stored in the computer-readable storage medium may perform the steps of any medical image segmentation method provided in the embodiments of this application, the instructions can implement beneficial effects that can be implemented by any medical image segmentation method provided in the embodiments of this application. For details, reference may be made to the foregoing embodiments. Details are not described herein again.

A medical image segmentation method and apparatus, a computer device, and a computer-readable storage medium provided in the embodiments of this application are described above in detail. Although the principles and implementations of this application are described by using specific examples in this specification, the descriptions of the foregoing embodiments are merely intended to help understand the method and the core idea of the method of this application. Meanwhile, a person skilled in the art may make modifications to the specific implementations and application range according to the idea of this application. In conclusion, the content of this specification is not to be construed as a limitation to this application.

What is claimed is:

1. A method for performing medical image segmentation, the method comprising:
   obtaining, by a device comprising a memory storing instructions and a processor in communication with the memory, a first medical image and a second medical image with a labeled region;
   performing, by the device, feature extraction on the first medical image and the second medical image respectively, to obtain first feature information of the first medical image and second feature information of the second medical image;
   obtaining, by the device, optical flow motion information from the second medical image to the first medical image according to the first feature information and the second feature information by:
   associating, by the device, the first feature information with the second feature information, to obtain pixel position correspondence information between the second medical image and the first medical image, and
   performing, by the device, an upsampling operation on the pixel position correspondence information, to obtain the optical flow motion information from the second medical image to the first medical image; and
   segmenting, by the device, the first medical image according to the optical flow motion information and the labeled region, to obtain a segmentation result of the first medical image.

2. The method according to claim 1, wherein the segmenting the first medical image according to the optical flow motion information and the labeled region, to obtain the segmentation result of the first medical image comprises:
   performing, by the device, reconstruction according to the optical flow motion information and the labeled region, to obtain a reconstructed region; and
   using, by the device, the reconstructed region as the segmentation result of the first medical image.

3. The method according to claim 2, wherein the performing reconstruction according to the optical flow motion information and the labeled region, to obtain the reconstructed region comprises:
   performing, by the device, trilinear interpolation on the optical flow motion information, to obtain processed optical flow motion information; and
   performing, by the device, reconstruction based on the processed optical flow motion information and the labeled region, to obtain the reconstructed region.

4. The method according to claim 1, wherein the associating the first feature information with the second feature information, to obtain pixel position correspondence information between the second medical image and the first medical image comprises:
   performing, by the device, a convolution operation on the first feature information of the first medical image, to obtain first convolution feature information;
   performing, by the device, a convolution operation on the second feature information of the second medical image, to obtain second convolution feature information;
   fusing, by the device, the first convolution feature information and the second convolution feature information, to obtain first fusion feature information; and
   fusing, by the device, the first fusion feature information and the first convolution feature information, to obtain the pixel position correspondence information between the second medical image and the first medical image.

5. An apparatus for performing medical image segmentation, the apparatus comprising:
   a memory storing instructions; and
   a processor in communication with the memory, wherein, when the processor executes the instructions, the processor is configured to cause the apparatus to perform:
   obtaining a first medical image and a second medical image with a labeled region,
   performing feature extraction on the first medical image and the second medical image respectively, to obtain first feature information of the first medical image and second feature information of the second medical image,
   obtaining optical flow motion information from the second medical image to the first medical image according to the first feature information and the second feature information by:
  associating the first feature information with the second feature information, to obtain pixel position correspondence information between the second medical image and the first medical image, and
  performing an upsampling operation on the pixel position correspondence information, to obtain the optical flow motion information from the second medical image to the first medical image, and
segmenting the first medical image according to the optical flow motion information and the labeled region, to obtain a segmentation result of the first medical image.

6. The apparatus according to claim 5, wherein, when the processor is configured to cause the apparatus to perform segmenting the first medical image according to the optical flow motion information and the labeled region, to obtain the segmentation result of the first medical image, the processor is configured to cause the apparatus to perform:
  performing reconstruction according to the optical flow motion information and the labeled region, to obtain a reconstructed region; and
  using the reconstructed region as the segmentation result of the first medical image.

7. The apparatus according to claim 6, wherein, when the processor is configured to cause the apparatus to perform performing reconstruction according to the optical flow motion information and the labeled region, to obtain the reconstructed region, the processor is configured to cause the apparatus to perform:
  performing trilinear interpolation on the optical flow motion information, to obtain processed optical flow motion information; and
  performing reconstruction based on the processed optical flow motion information and the labeled region, to obtain the reconstructed region.

8. The apparatus according to claim 5, wherein, when the processor is configured to cause the apparatus to perform associating the first feature information with the second feature information, to obtain pixel position correspondence information between the second medical image and the first medical image, the processor is configured to cause the apparatus to perform:
  performing a convolution operation on the first feature information of the first medical image, to obtain first convolution feature information;
  performing a convolution operation on the second feature information of the second medical image, to obtain second convolution feature information;
  fusing the first convolution feature information and the second convolution feature information, to obtain first fusion feature information; and
  fusing the first fusion feature information and the first convolution feature information, to obtain the pixel position correspondence information between the second medical image and the first medical image.

9. A non-transitory computer-readable storage medium, storing computer-readable instructions, wherein, the computer-readable instructions, when executed by a processor, are configured to cause the processor to perform:
  obtaining a first medical image and a second medical image with a labeled region;
  performing feature extraction on the first medical image and the second medical image respectively, to obtain first feature information of the first medical image and second feature information of the second medical image;
  obtaining optical flow motion information from the second medical image to the first medical image according to the first feature information and the second feature information by:
    associating the first feature information with the second feature information, to obtain pixel position correspondence information between the second medical image and the first medical image, and
    performing an upsampling operation on the pixel position correspondence information, to obtain the optical flow motion information from the second medical image to the first medical image; and
  segmenting the first medical image according to the optical flow motion information and the labeled region, to obtain a segmentation result of the first medical image.

10. The non-transitory computer-readable storage medium according to claim 9, wherein, when the computer-readable instructions are configured to cause the processor to perform segmenting the first medical image according to the optical flow motion information and the labeled region, to obtain the segmentation result of the first medical image, the computer-readable instructions are configured to cause the processor to perform:
  performing reconstruction according to the optical flow motion information and the labeled region, to obtain a reconstructed region; and
  using the reconstructed region as the segmentation result of the first medical image.

11. The non-transitory computer-readable storage medium according to claim 10, wherein, when the computer-readable instructions are configured to cause the processor to perform performing reconstruction according to the optical flow motion information and the labeled region, to obtain the reconstructed region, the computer-readable instructions are configured to cause the processor to perform:
  performing trilinear interpolation on the optical flow motion information, to obtain processed optical flow motion information; and
  performing reconstruction based on the processed optical flow motion information and the labeled region, to obtain the reconstructed region.

12. The non-transitory computer-readable storage medium according to claim 9, wherein, when the computer-readable instructions are configured to cause the processor to perform associating the first feature information with the second feature information, to obtain pixel position correspondence information between the second medical image and the first medical image, the computer-readable instructions are configured to cause the processor to perform:
  performing a convolution operation on the first feature information of the first medical image, to obtain first convolution feature information;
  performing a convolution operation on the second feature information of the second medical image, to obtain second convolution feature information;
  fusing the first convolution feature information and the second convolution feature information, to obtain first fusion feature information; and
  fusing the first fusion feature information and the first convolution feature information, to obtain the pixel position correspondence information between the second medical image and the first medical image.

\* \* \* \* \*